US006732609B2

(12) United States Patent
Asai et al.

(10) Patent No.: US 6,732,609 B2

(45) Date of Patent: May 11, 2004

(54) MOVING APPARATUS AND DISPLACING APPARATUS

(75) Inventors: Koichi Asai, Okazaki (JP); Kazuo Amano, Okazaki (JP); Yasuo Muto, Chiryyu (JP); Kazuaki Mori, Anjo (JP); Ye JianMing, Toyota (JP)

(73) Assignee: Fuji Machine Mfg. Co., Ltd., Chiryu (JP)

(*) Notice: Subject to any disclaimer, the term of this patent is extended or adjusted under 35 U.S.C. 154(b) by 0 days.

(21) Appl. No.: 10/201,716

(22) Filed: Jul. 24, 2002

(65) Prior Publication Data

US 2002/0189389 A1 Dec. 19, 2002

Related U.S. Application Data

(62) Division of application No. 09/564,834, filed on May 4, 2000.

(30) Foreign Application Priority Data

May 14, 1999 (JP) .......................................... 11-133862
Mar. 29, 2000 (JP) ........................................ 2000-91933

(51) Int. Cl.[7] ................................................ B25J 9/00

(52) U.S. Cl. ............................... 74/490.04; 74/490.09; 74/89.22

(58) Field of Search ......................... 74/490.04, 490.09, 74/89.2, 89.21, 89.22

(56) References Cited

U.S. PATENT DOCUMENTS 2,785,941 A 3/1957 Macklem
3,926,061 A 12/1975 Paulson
4,315,437 A 2/1982 Etcheparre et al.
5,073,079 A 12/1991 Akagawa
5,198,736 A 3/1993 Azuma et al.
5,379,514 A * 1/1995 Okuda et al. ................. 29/833
5,481,794 A 1/1996 Fischer et al.
5,850,579 A 12/1998 Melby et al.
6,070,480 A 6/2000 Kerschner

FOREIGN PATENT DOCUMENTS

DE 1 944 752 3/1971
DE 39 26 670 A1 2/1991
EP 0 315 310 A1 5/1989
JP A-8-150579 6/1996
JP 10 094937 4/1998
WO WO 96/37346 11/1996
WO WO 97/02931 1/1997

* cited by examiner

*Primary Examiner*—William C. Joyce
(74) *Attorney, Agent, or Firm*—Oliff & Berridge, PLC

(57) ABSTRACT

An apparatus for displacing two displaceable members, including a first member, a second member which is supported by the first member such that the second member is displaceable relative to the first member, a third member which is supported by the second member such that the third member is displaceable relative to the second member, a first and a second drive source which have respective output members and each of which is not movable relative to the first member, a mechanically motion-transmitting device which is connected to the respective output members of the first and second drive sources and to the second and third members and which mechanically transmits respective motions of the output members to the second and third members while allowing the second and third members to be displaced relative to each other, and a displacement control device which is connected to the first and second drive sources and which controls the first and second drive sources and thereby controls the displacement of each of the second and third members relative to the first member.

5 Claims, 14 Drawing Sheets

614 616 X Y 622 606 608 522 518 618 602 604 532 620 624 506 610 542 612 600 514

MOVING APPARATUS AND DISPLACING APPARATUS

This is a Division of application Ser. No. 09/564,834, filed May 4, 2000. The entire disclosure of the prior application is hereby incorporated by reference herein in its entirety.

BACKGROUND OF INVENTION

1. Field of Invention

The present invention relates to a moving device which moves a movable member in two directions perpendicular to each other, and a displacing device which causes a displaceable member to do a displacement including two or more components.

2. Related Art Statement

There is known a moving apparatus which includes a base member; two drive sources; a drive-force transmitting device which transmits respective drive forces of the two drive sources to two movable members each of which is movable relative to the base member; and a movement control device which controls the two drive sources and thereby controls the movement of each of the two movable members. The two movable members includes a first movable member which is movable relative to the base member in a first direction; and a second movable member which is movable relative to the first movable member in a second direction perpendicular to the first direction. The two drive sources includes a first drive source which is provided on the base member and which moves the first movable member in the first direction; and a second drive source which is provided on the first movable member and which moves the second movable member in the second direction. The drive-force transmitting device includes, in many cases, two ball-screw devices which are provided for the first and second drive sources, respectively. The movement control device controls the movement of the first movable member by controlling the first drive source, and controls the movement of the second movable member by controlling the second drive source, so that the second movable member is moved relative to the base member in the first direction, the second direction, or a direction inclined relative to the first and second directions.

However, since the prior moving apparatus employs the second drive source which is provided on the first movable member, cables or hoses for supplying the second drive source with energy in the form of electric current or pressurized fluid trail the first movable member, as the first movable member is moved. Thus, the prior moving apparatus cannot enjoy high durability or ease of use. In addition, since the ball-screw devices cost high, the prior apparatus also costs high.

SUMMARY OF THE INVENTION

The present invention provides a displacing device which has one or more of the technical features that are described below in respective paragraphs given parenthesized sequential numbers (1) to (24). Any technical feature that includes another technical feature shall do so by referring, at the beginning, to the parenthesized sequential number given to that technical feature. Thus, two or more of the following features may be combined, if appropriate. Each feature may be accompanied by a supplemental explanation, as needed. However, the following features and the appropriate combinations thereof are just examples to which the present invention is by no means limited. In addition, in the case where a certain technical feature includes a plurality of items, it is not always necessary to employ those items altogether, but it is possible to employ only one item of those items.

(1) According to a first feature of the present invention, there is provided an apparatus for displacing at least two displaceable members, comprising a first member; the at least two displaceable members comprising a second member which is supported by the first member such that the second member is displaceable relative to the first member, and a third member which is supported by the second member such that the third member is displaceable relative to the second member; at least two drive sources including a first drive source and a second drive source which have respective output members and each of which is not movable relative to the first member; a mechanically motion-transmitting device which is connected to the respective output members of the first and second drive sources and to the second and third members and which mechanically transmits respective motions of the respective output members to the second and third members while allowing the second and third members to be displaced relative to each other; and a displacement control device which is connected to the first and second drive sources and which controls the first and second drive sources and thereby controls the displacement of each of the second and third members relative to the first member. The first member may be a stationary member, or alternatively a movable member which is sufficiently slowly moved in a horizontal direction. More specifically described, the first member may be supported by a stationary member which is stationary or immovable, such that the first member is movable relative to the stationary member, the drive sources may be provided on the first member, and an energy supplying source which supplies energy to the drive sources, and/or a signal transmitting device which transmits signals supplied from a control device, to the drive sources, may be provided on the stationary member. If the first member is moved sufficiently slowly, cables and/or hoses of the energy supplying source and/or the signal transmitting device can trail the first member without raising any problems. The second and third members may be commonly displaced by the first and second drive sources, or alternatively one of the second and third members may be displaced by one of the first and second drive sources and the other member may be displaced by both the first and second drive sources. In the present displacing apparatus, the third member can be displaced relative to the second member, even if no drive sources are provided on the second member. Therefore, the present apparatus is free from the problem that when the second member is moved, cables and/or hoses for supplying energy to drive sources which are provided on the second member trails the second member. In addition, the present apparatus can be used without being disturbed by the cables and/or the hoses. Thus, the present apparatus can enjoy high durability and ease of use.

(2) According to a second feature of the present invention that includes the first feature (1), the first member comprises a base member which is not movable, the second member comprises a first movable member which is movable relative to the base member in a first direction, the third member comprises a second movable member which is movable relative to the first movable member in a second direction perpendicular to the first direction, and the mechanically motion-transmitting device comprises two drive wheels which are provided, on the base member, at respective positions distant from each other in at least the second direction, and which are connected to, and are rotated by, the first and second drive sources, respectively; two base-member-side driven wheels which are supported by the base member such that the two base-member-side driven wheels correspond to the two drive wheels, respectively; at least one movable-member-side driven wheel which is supported by the first movable member; a wound-on member which is wound on the drive wheels, the base-member-side driven wheels, and the movable-member-side driven wheel, so that a plurality of portions of the wound-on member extend parallel to each other in the first direction, and which moves, when the drive wheels are rotated by the drive sources, the first movable member in the first direction; and an associating device which associates the wound-on member with the second movable member so that the second movable member is moved in the second direction. The present displacing apparatus can be called as a moving apparatus. In the present moving apparatus, the two drive sources are associated with the base member, which supports the two drive wheels which are rotated by the two drive sources, respectively, and the two base-member-side driven wheels which corresponds to the two drive wheels, respectively. The two drive wheels are provided at respective positions which are distant from each other in at least the second direction. The two drive wheels may be provided, in the first direction, either at the same position, or respective positions distant from each other. However, if the two drive wheels are provided at the same position in the second direction, the present moving apparatus cannot move the second movable member in both the first and second directions. The first movable member supports at least one movable-member-side driven wheel. Preferably, the present apparatus employs four movable-member-side driven wheels corresponding to the two drive wheels and the two base-member-side driven wheels, respectively. However, as will be explained in DETAILED DESCRIPTION OF THE PREFERRED EMBODIMENTS, it is possible to employ only one or two movable-member-side driven wheels. The wound-on member is wound on the drive wheels, the base-member-side driven wheels, and the movable-member-side driven wheel. The respective drive forces of the two drive sources are transmitted to the first movable member via those wheels and the wound-on member, so that the first movable member is moved in the first direction. The associating device associates the second movable member with the wound-on member, so that as the wound-on member is moved, the second movable member is moved in the second direction. Thus, the second movable member of the present moving apparatus is not moved by the drive force of a drive source supported by the first movable member, unlike that of the previously-described conventional moving apparatus. In the present moving apparatus, the second movable member can be moved relative to the first movable member in the second direction, even if the drive sources may not be provided on the first movable member. Therefore, the present apparatus is free from the problem that when the first movable member is moved, cables and/or hoses for supplying energy to drive sources which are provided on the first movable member trails the first movable member. In addition, since the present apparatus can be used without being disturbed by the cables and/or the hoses, it can be easily used. Moreover, since the mechanically motion-transmitting device are provided by the wheels and the wound-on member, the present apparatus can be produced at lower cost than the conventional apparatus which employs the drive-force transmitting device including the ball-screw devices. Since the wound-on member is wound on the wheels such that the plurality of portions of the wound-on member extending in the first direction are parallel to each other, the wound-on member is prevented from being slacked or stretched when the first movable member is moved in the first direction. For example, in the case where the two drive wheels and the two base-member-side driven wheels are provided on the base member such that the two drive wheels are distant from the two base-member-side driven wheels in the first direction, the wound-on member has, as the portions thereof extending in the first direction, two first portions located between the two drive wheels and the two base-member-side driven wheels, respectively, two second portions located between the two drive wheels and the two movable-member-side driven wheels, respectively, and two third portions located between the two base-member-side driven wheels and the two movable-member-side driven wheels, respectively. When the first movable member is moved in the first direction, the second portions of the wound-on member are lengthened or shortened, and simultaneously the third portions of the same shortened or lengthened by the same amount or length as that by which the second portions are lengthened or shortened. Therefore, the wound-on member is not slacked or stretched when the first movable member is moved in the first direction. The wound-on member may be a belt such as a flat belt, a V-belt, or a cog belt (i.e., a timing belt), or a wire, or a chain. Each of the wheels may be a pulley such as a flat pulley, a V-belt pulley, or a timing pulley, or a sprocket, depending upon the sort of the wound-on member employed. The drive wheels may be directly or indirectly rotated by the drive sources. In one example of the former case, the two drive wheels are fixed to respective output shafts or two electric motors as the two drive sources, such that the drive wheels are not rotatable relative to the corresponding output shafts. In this example, each of the drive wheels is rotated at the same speed as that at which a corresponding one of the electric motors is rotated. In one example of the latter case, the two drive wheels are connected to respective output shafts of two electric motors via respective speed-change devices such as gear units. In the last example, each of the drive wheels may be rotated at a speed different from that at which a corresponding one of the electric motors is rotated.

(3) According to a third feature of the present invention that includes the second feature (2), the mechanically motion-transmitting device comprises at least two the movable-member-side driven wheels which are provided, on the first movable member, at respective positions distant from each other in the second direction. For example, in the case where the first movable member is elongate in the second direction, and if the two movable-member-side driven wheels are provided at respective positions distant from each other in the second direction, the two drive wheels may be provided at respective positions distant from each other in the second direction, and the two base-member-side driven wheels may be provided at respective positions distant from each other in the second direction, so that the first movable member elongate in the second direction can be driven in the vicinity of opposite end portions thereof. In many cases, the first movable member elongate in the second direction is guided, in the vicinity of opposite end portions thereof, by a guide device. In those cases, since the first movable member is driven in the vicinity of the guide device, the first movable member can be prevented from being subjected to an angular moment or a resultant frictional resistance (rolling friction as well as sliding friction). In many cases, in a space below the first movable member elongate in the second direction, an object which is subjected to an operation carried out by a certain device attached to the second movable member, and a supporting device which supports the object are provided. In those cases, the wound-on member can be easily prevented from being interfered with by the object and/or the supporting device. It is preferable, but not essential, that the two movable-member-side driven wheels be provided at respective positions distant from each other in the second direction, at the same position in the first direction.

(4) According to a fourth feature of the present invention that includes the third feature (3), the associating device is provided between the two movable-member-side driven wheels. In this case, since the associating device is provided between the two movable-member-side driven wheels distant from each other in the second direction, the second movable member can be easily moved in the second direction.

(5) According to a fifth feature of the present invention that includes the fourth feature (4), the associating device comprises an engaging device which directly engages the second movable member with a portion of the wound-on member located between the two movable-member-side driven wheels. Since the second movable member is directly engaged with the portion of the wound-on member located between the two movable-member-side driven wheels, the second movable member can be moved when the wound-on member is moved. The engaging device may be a same-speed-type engaging device which engages the second movable member with the wound-on member such that the second movable member is moved at the same speed as that at which the wound-on member is moved; or a speed-change-type engaging device which engages the second movable member with the wound-on member such that the second movable member is moved at a speed different from that at which the wound-on member is moved. The same-speed-type engaging device may be a connecting device which connects the second movable member to the wound-on member such that the second movable member is not movable relative to the wound-on member. The speed-change-type engaging device may be a speed-change device which transmits the movement of the wound-on member to the second movable member such that the second movable member is moved at a speed increased or decreased from that at which the wound-on member is moved.

(6) According to a sixth feature of the present invention that includes the fourth or fifth feature (4) or (5), the second movable member is provided at a position which is distant from a position where the two movable-member-side driven wheels are supported by the first movable member, in a third direction perpendicular to the first and second directions, and the associating device comprises an indirect associating device which comprises two second-movable-member-associated driven wheels which are provided at respective positions distant in the third direction from respective positions where the two movable-member-side driven wheels are provided, and are rotated by the two movable-member-side driven wheels, respectively; a second-movable member-associated wound-on member which is wound on the two second-movable-member-associated driven wheels; and an engaging device which engages the second movable member with the second-movable-member-associated wound-on member. In the case where the first movable member is thick in the third direction perpendicular to the first and second directions and the position where the second movable member is provided is distant from the position where the wound-on member is provided in the third direction, it is difficult to directly transmit the movement of the wound-on member to the second movable member. However, the indirect associating device according to this feature can advantageously transmit the movement of the wound-on member to the second movable member. According to this feature, it is required that the second-movable-member-associated driven wheels be rotated when the movable-member-side driven wheels are rotated. However, the second-movable-member-associated driven wheels may be rotated at the same speed as, or a speed different from, that at which the movable-member-side driven wheels are rotated. The engaging device may be the above-described same-speed-type or speed-change-type engaging device.

(7) According to a seventh feature of the present invention that includes any one of the second to sixth features (2) to (6), the first and second drive sources comprise two electric motors, and the two drive wheels have a same size, the apparatus further comprises two substantially identical connecting devices which connect the two electric motors to the corresponding drive wheels, respectively, and the displacement control device comprises an electric-motor control device which is operable in each of a second-direction moving manner in which the electric-motor control device rotates the two electric motors in a same direction at a same velocity, so that the first movable member is kept still and the second movable member is moved relative to the first movable member in the second direction, a first-direction moving manner in which the electric-motor control device rotates the two electric motors in opposite directions, respectively, at a same velocity, so that the second movable member is kept still relative to the first movable member and the first movable member is moved relative to the base member in the first direction, and accordingly the second movable member is moved relative to the base member in the first direction, and an inclined-direction moving manner in which the electric-motor control device rotates the two electric motors at different velocities, so that the first movable member is moved relative to the base member in the first direction and the second movable member is moved relative to the first movable member in the second direction, and accordingly the second movable member is moved relative to the base member in an inclined direction having a first-direction component parallel to the first direction and a second-direction component parallel to the second direction. The "substantially identical" connecting devices may be kinematically or functionally identical connecting devices, and need not have the same shape and size. In the case where the two electric motors are rotated at the same speed in the same direction, all the wheels including the drive wheels, the base-member-side driven wheels and the movable-member-side driven wheel are rotated in the same direction. The distances between the movable-member-side driven wheel and the drive wheels, and the distances between the movable-member-side driven wheel and the base-member-side driven wheels are not changed, so that the first movable member is not moved in the first direction and, as the wound-on member is moved, the second movable member is moved relative to the first movable member in the second direction. That is, the second movable member is moved relative to the base member in the second direction. In the case where the two electric motors are rotated at the same speed, but in opposite directions, respectively, the first distances between the movable-member-side driven wheel and the drive wheels are shortened, or lengthened, and simultaneously the second distances between the movable-member-side driven wheel and the base-member-side driven wheels are lengthened, or shortened by the same amount or distance as that by which the first distances are shortened or lengthened, so that as the wound-on member is moved, the first movable member is moved relative to the base member in the first direction but the second movable member is not moved relative to the first movable member. That is, the second movable member is moved relative to the base member in the first direction. In the case where the two electric motors are rotated at different speeds, the above-described two sorts of movements simultaneously occur, so that both the first and second movable members are moved. Since the second movable member is moved relative to the base member, together with the first movable member, in the first direction and simultaneously is moved relative to the first movable member in the second direction, eventually the second movable member is moved relative to the base member in an inclined direction having a first component parallel to the first direction and a second component parallel to the second direction. The direction of movement of the second movable member can be freely changed by changing the respective rotation directions and speeds of the two electric motors, including stopping one of the two motors. The present displacing apparatus can be called as a moving apparatus. In the present moving apparatus, the two drive wheels have a same size (i.e., a same diameter), and each of the drive wheels is rotated at the same angular speed as that at which a corresponding one of the two electric motors is rotated, or the two drive wheels are rotated at respective speeds changed by a same ratio from those at which the two electric motors are rotated. Accordingly, an increased number of common parts can be employed, and the electric motors can be easily controlled. However, the seventh feature (7) is not an essential one. Even in the case where the present moving apparatus employs two drive wheels having different diameters, and/or rotates two drive wheels at different angular speeds, the present apparatus can move the first and second movable members in the same manner as that employed according to the seventh feature (7), by controlling the electric motors as will be described below.

(8) According to an eighth feature of the present invention that includes any one of the second to sixth features (2) to (6), the two drive sources comprise two electric motors, and the displacement control device comprises an electric-motor control device which is operable in each of a second-direction moving manner in which the electric-motor control device rotates the two electric motors to rotate the two drive wheels in a same direction at a same circumferential velocity, so that the first movable member is kept still and the second movable member is moved relative to the first movable member in the second direction, a first-direction moving manner in which the electric-motor control device rotates the two electric motors to rotate the two drive wheels in opposite directions, respectively, at a same circumferential velocity, so that the second movable member is kept still relative to the first movable member and the first movable member is moved relative to the base member in the first direction, and accordingly the second movable member is moved relative to the base member in the first direction, and an inclined-direction moving manner in which the electric-motor control device rotates the two electric motors to rotate the two drive wheels at different circumferential velocities, so that the first movable member is moved relative to the base member in the first direction and the second movable member is moved relative to the first movable member in the second direction, and accordingly the second movable member is moved relative to the base member in an inclined direction having a first-direction component parallel to the first direction and a second-direction component parallel to the second direction. According to this feature, it is not essentially required that the two drive wheels have a same size, or that the respective angular speeds at which the two electric motors are rotated be changed by a same ratio before being transmitted to the two drive wheels, respectively.

(9) According to a ninth feature of the present invention that includes any one of the second to eighth features (2) to (8), the displacement control device comprises a position obtaining device which obtains respective positions of the second movable member relative to the base member in the first and second directions, and controls the first and second drive sources based on the respective positions of the second movable member obtained by the position obtaining device. The position obtaining device may be one which includes a position detecting device which detects respective actual positions of the second movable member in the first and second directions, or one which includes a drive-source-operating-state detecting device for detecting respective operating states of the two drive sources, and estimates, based on the detected operating states, respective positions of the second movable member in the first and second directions. The position detecting device may be a linear scale which optically, electrically, or magnetically detects the positions of the second movable member. The drive-source-operating-state detecting device may be, in the case where the drive sources are electric motors, respective encoders for detecting respective angular positions of the electric motors. In the case where the position obtaining device is provided by the one which includes the position detecting device, the wound-on member may be provided by a wire or a flat belt. Since the position detecting device detects the actual positions of the second movable member, the wound-on member is allowed to slide relative to the drive wheels. In the case where the position obtaining device is provided by the one which includes the drive-source-operating-state detecting device, the wound-on member needs to be provided by a cog belt or a chain. If the wound-on member slides relative to the drive wheels, the positions of the second movable member cannot be accurately estimated.

(10) According to a tenth feature of the present invention that includes any one of the first to ninth features (1) to (9), the displacing apparatus further comprises at least one device selected from the group consisting of an electric-component holder, an image taking device, and an adhesive dispenser, and the at least one device is attached to the third member. The electric-component holder is for holding an electric component for the purpose of, e.g., mounting the component on a circuit substrate, and may be a component sucker which applies negative pressure or air suction to an electric component and holds the component. In the case where the electric-component holder is attached to the second movable member as the third member according to the second feature (2), the holder can be moved to any arbitrary positions in the first and second directions, so that at those positions the electric component is mounted on the circuit substrate which is supported by a circuit-substrate supporting device. The image taking device may be a device which takes respective images of reference-position marks which are provided on a circuit board or a screen (or a screen holder). The image taking device is moved to a predetermined position above the circuit substrate or the screen, so that at that position the image taking device takes images of the reference-position marks. Based on respective errors of the actual positions of those marks from their correct positions, positions of the circuit substrate or the screen are corrected, or positions of the electric-component holder or the adhesive dispenser (described below) are adjusted. The adhesive dispenser is for applying adhesive to a circuit substrate, and is moved to a predetermined position above the circuit substrate so that at that position the adhesive dispenser applies the adhesive to the substrate. Two or all of the electric-component holder, the image taking device and the adhesive dispenser may be attached to the third member (e.g., the second movable member). In this case, it is not needed to employ the same number of moving devices as the number (i.e., three) of the above-indicated devices. This contributes to reducing the production cost of the present displacing apparatus. Each of the electric-component holder, the image taking device and the adhesive dispenser may be attached to the second movable member in a first manner in which the each device is not movable relative to the second movable member, in a second manner in which the each device is movable relative to the second movable member via a third movable member which is movable relative to the second movable member in a third direction perpendicular to the first and second directions, or via a different movable member, or in a third manner in which the each device is rotatable relative to the second movable member.

(11) According to an eleventh feature of the present invention that includes the first feature (1), the first member comprises a base member which is not movable, the second member comprises a movable member which is movable relative to the base member in a first direction, the third member comprises a rotatable member which is rotatable relative to the first movable member, and the mechanically motion-transmitting device comprises two drive wheels which are provided, on the base member, at respective positions distant from each other in at least a second direction perpendicular to the first direction, and which are connected to, and are rotated by, the first and second drive sources, respectively; two base-member-side driven wheels which are supported by the base member such that the two base-member-side driven wheels correspond to the two drive wheels, respectively; at least one movable-member-side driven wheel which is supported by the movable member; a wound-on member which is wound on the drive wheels, the base-member-side driven wheels, and the movable-member-side driven wheel, so that a plurality of portions of the wound-on member extend parallel to each other in the first direction, and which moves, when the drive wheels are rotated by the drive sources, the movable member in the first direction; and an associating device which associates the wound-on member with the rotatable member so that the rotatable member is rotated relative to the movable member. The present displacing apparatus may employ one or more of the third to tenth features (3) to (10). For example, in the case where the present apparatus employs the eighth feature (8), the two drive sources comprises two electric motors, and the displacement control device comprises an electric-motor control device which is operable in each of a rotating manner in which the electric-motor control device rotates the two electric motors to rotate the two drive wheels in a same direction at a same circumferential velocity, so that the movable member is kept still and the rotatable member is rotated relative to the movable member, a first-direction moving manner in which the electric-motor control device rotates the two electric motors to rotate the two drive wheels in opposite directions, respectively, at a same circumferential velocity, so that the rotatable member is not rotated and the movable member is moved relative to the base member in the first direction, and accordingly the rotatable member is moved relative to the base member in the first direction, and a moving and rotating manner in which the electric-motor control device rotates the two electric motors to rotate the two drive wheels at different circumferential velocities, so that the movable member is moved relative to the base member in the first direction and the rotatable member is rotated relative to the movable member, and accordingly the rotatable member is moved relative to the base member in the first direction and is rotated relative to the base member. The rotatable member may be an end displaceable member, or one which supports another displaceable member. In the latter case, for example, an electric-component holder may be directly attached to the rotatable member, so that as the rotatable member is rotated, the holder is directly rotated, or alternatively an electric-component holder may be indirectly attached to the rotatable member via a different movable member and a motion converting device which converts the rotation of the rotatable member into a different motion of the different movable member, such as a linear movement, e.g., in a direction (e.g., a vertical direction) perpendicular to the first direction, so that as the rotatable member is rotated, the holder attached to the different movable member is moved in the direction defined by the converting device.

(12) According to a twelfth feature of the present invention that includes the first feature (1), the mechanically motion-transmitting device comprises a first drive wheel which is rotated by the first drive source; a first driven wheel which is supported by the first member such that the first driven wheel is not movable, and is rotatable, relative to the first member; and a first wound-on member which is wound on the first drive wheel and the first driven wheel and which causes, when the first drive wheel is rotated, the second member to do a first displacement; a second drive wheel, which is rotated by the second drive source; a plurality of second driven wheels which are supported by the second member such that each of the second driven wheels is not movable, acid is rotatable, relative to the second member; at least one third driven wheel which is supported by the third member such that the third driven wheel is not movable, and is rotatable, relative to the third member; a second wound-on member which is wound on the second drive wheel and the second and third driven wheels and which causes, when the second drive wheel is rotated, the third member to do a second displacement; and an inhibiting member which is supported by the first member and which inhibits, under a predetermined condition, the second wound-on member from being freely moved, and the displacement control device comprises a first cooperation control device which is connected to at least the second drive source and which controls the second drive source to cooperate with the first drive source to cause the third member to do the second displacement equal to a sum of the first displacement of the second member and a displacement different from the first displacement. In the present displacing apparatus, the first drive wheel, the first driven wheel, and the first wound-on member cooperate with one another to provide a first motion-transmitting device; and the second drive wheel, the second driven wheel, the third driven wheel, the second wound-on member, and the inhibiting member cooperate with one another to provide a second motion-transmitting device. The inhibiting member may be provided by the first drive wheel which is rotated by the first drive source, or a fixed member which holds the second wound member such that the second wound-on member is not movable. Anyway, the inhibiting member supports the second wound-on member, at a position opposite to the second drive wheel with respect to the third member, such that the second wound-on member has portions extending parallel to portions of the first wound-on member, and inhibits the second wound-on member from being freely moved when the second drive wheel is rotated.

(13) According to a thirteenth feature of the present invention that includes the twelfth feature (12), the mechanically motion-transmitting device comprises a first motion-transmitting device which is connected to the output member of the first drive source and to the second member, and which mechanically transmits the motion of the output member of the first drive source to the second member so that the second member does the first displacement; and a second motion-transmitting device which is connected to the respective output members of the first and second drive sources and to the third member, and which mechanically transmits the respective motions of the respective output members of the first and second drive sources to the third member so that the third member does the second displacement. For example, in the case where the second member is movable relative to the first member and the third member is movable relative to the second member, the third member can do, relative to the first member, a composite movement of the two movements in different directions. In the case where one of the second and third members is movable and the other member is rotatable, the third member can do, relative to the first member, a composite movement of the movement and the rotation. In the case where the second member is rotatable relative to the first member and the third member is rotatable relative to the second member, the third member can revolve, relative to the first member, while rotating about its own axis line. In the present displacing apparatus, the displacement of the second member is controlled by the first drive source, and the displacement of the third member is controlled by the first and second drive sources. The first and second motion-transmitting devices are independent of each other, and each one of the two devices can transmit the motion of the output member of at least one of the drive sources to a corresponding one of the second and third members, while allowing the other device to transmit the motion of the output member of the other drive source to the other of the second and third members. In other words, the each one of the two motion-transmitting devices can cooperate with the at least one of the drive sources to accommodate the displacement of the other of the second and third members. Preferably, the first cooperation control device is provided by a single control device which includes respective portions for controlling the first and second drive sources, respectively. Alternatively, the first cooperation control device may be provided by two exclusive control devices which correspond to the first and second drive sources, respectively, and which cooperate with each other to control the two drive sources.

(14) According to a fourteenth feature of the present invention that includes the twelfth feature (12), the mechanically motion-transmitting device comprises a first motion-transmitting device which is connected to the output member of the first drive source and to the second member, and which mechanically transmits the motion of the output member of the first drive source to the second member so that the second member does the first displacement; and a second motion-transmitting device which is connected to the output member of the second drive source and to the third member, and which mechanically transmits the motion of the output member of the second drive source to the third member so that the third member does the second displacement. In the present displacing apparatus, the second and third members are displaced by the first and second drive sources which are independent of each other. Preferably, the first cooperation control device is provided by two exclusive control devices which correspond to the first and second drive sources, respectively. However, the first cooperation control device may be one which includes a detecting device for detecting the displacement of the second member, and controls the second drive source based on the displacement of the second member detected by the detecting device.

(15) According to a fifteenth feature of the present invention that includes the thirteenth feature (13), the second member comprises a movable member which is movable relative to the first member in a first direction, the first and second drive wheels are provided, on the first member, at respective positions distant from each other in the first direction, the first motion-transmitting device comprises the first drive wheel, the first driven wheel supported by the first member and corresponding to the first drive wheel, and the first wound-on member wound on the first drive wheel and the first driven wheel, and the second motion-transmitting device comprises the first drive wheel, the second drive wheel, the second driven wheels supported by the second member such that each of the second driven wheels is not movable relative to the second member, the third driven wheel supported by the third member such that the third driven wheel is not movable relative to the third member, and the second wound-on member wound on the first and second drive wheels and the second aid third driven wheels. In the present displacing apparatus, the two drive wheels are distant from each other in the first direction, and the second wound-on member is wound on the two drive wheels such that the second wound-on member include a plurality of first portions which extend in the first direction, and is wound on the second and third driven wheels such that the second wound-on member include a plurality of second portions which extend in the second direction. Respective displacing apparatuses according to the sixteenth and seventeenth features (16), (17) are examples of the displacing apparatus according to the fifteenth feature (15). In the present displacing apparatus, the second wound-on member allows the third member to be moved in the first direction, and transmits the respective drive forces of the first and second drive sources to the third member, so that the third member does the second displacement.

(16) According to a sixteenth feature of the present invention that includes the fifteenth feature (15), the third member is supported by the second member such that the third member is movable relative to the second member in a second direction perpendicular to the first direction, and the second motion-transmitting device comprises a plurality of the third driven wheels which are provided, on the third member, at respective positions distant from each other in the second direction, so that the second wound-on member have a plurality of first portions which extend in the first direction and a plurality of second portions which extend in the second direction. In the present displacing apparatus, the second and third driven wheel cooperate with each other to guide the second portions of the second wound-on member that extend in the second direction and, when the third driven members are moved relative to the second driven wheels, the third member is moved relative to the second member in the second direction. Since the second wound-on member includes the first and second portions extending ion the first and second directions, respectively, the second wound-on member allows the third member to be moved in the first direction.

(17) According to a seventeenth feature of the present invention that includes the fifteenth or sixteenth feature (15) or (16), the plurality of second driven wheels comprise an even number of driven wheels including at least two first pairs of driven wheels which guide the second wound-on member such that the second wound-on member have a plurality of first portions which extend in the first direction and a plurality of second portions which extend in a second direction perpendicular to the first direction, and at least two second pairs of driven wheels which are provided, on the second member, at two positions distant from each other in the second direction, respectively, and which define respective lengths of the second portions of the second wound-on member, and the second motion-transmitting device comprises a plurality of the third driven wheels which are provided, on the third member, at respective positions distant from each other in the second direction. In the displacing apparatus according to the sixteenth feature (16), the range in which the third member is movable is defined by the distance between the two third driven wheels provided on the third member, and a space needed for displacing the displacing apparatus must have a length equal to twice the distance between the two third driven wheels. In contrast, in the present displacing apparatus according to the seventeenth feature (17), the range in which the third member is movable is defined by the distance between the two second pairs of second driven wheels that are the most distant from each other in the second direction. Therefore, the dimension of the second member of the present apparatus in the second direction must be greater than that of the second member of the apparatus according to the sixteenth feature (16) but the area needed for operating the present apparatus may be smaller than that needed for operating the latter apparatus. Moreover, in the present apparatus, the size of the third member can be easily reduced.

(18) According to an eighteenth feature of the present invention that includes the sixteenth or seventeenth feature (16) or (17), the first and second wound-on members are distant from each other in a third direction perpendicular to the first and second directions. In the present displacing apparatus, since the two wound-on members are distant from each other in the third direction, the two wound-on members are easily prevented from being interfered with by each other.

(19) According to a nineteenth feature of the present invention that includes any one of the twelfth to eighteenth features (12) to (18), the displacing apparatus further comprises a fourth member which is supported by the third member such that the fourth member is displaceable relative to the third member; a third drive source which has an output member and which is not movable relative to the first member; a third motion-transmitting device which is connected to the output member of the third drive source and to the fourth member, and which mechanically transmits motion of the output member of the third drive source to the fourth member so that the fourth member does a third displacement; and a second cooperation control device which is connected to at least the third drive source and which controls the third drive source to cooperate with the second drive source to cause the fourth member to do the third displacement equal to a sum of the second displacement of the third member and a displacement different from the second displacement. The fourth member may be a movable member which is movable in a certain direction, or in each of a plurality of directions which intersect each other, or a rotatable member. Each of the second and eleventh features (2), (11) may employ the nineteenth feature (19). The first and second cooperation control devices may be provided by different portions of a single control device, or two different control devices. In the present displacing apparatus, the third drive source may be independent of the first and second drive sources, so that the fourth member is displaced by the third drive source only. However, the fourth member may be displaced by the cooperation of the second and third drive sources. In the latter case, the first drive source which is independent of the second and third drive sources displaces the second member.

(20) According to a twentieth feature of the present invention that includes the nineteenth feature (19), the first member comprises a stationary member, the second member comprises a Y-axis movable member which is movable relative to the stationary member in a Y-axis direction parallel to a straight reference line, the third member comprises an X-axis movable member which is movable relative to the Y-axis movable member in an X-axis direction perpendicular to the Y-axis direction, and the fourth member comprises a Z-axis movable member which is movable relative to the X-axis movable member in a Z-axis direction perpendicular to the Y-axis and X-axis directions. The Z-axis movable member may be moved in the Z-axis direction by the cooperation of a rotatable member rotatable relative to the third member, and a converting device which converts the rotation of the rotatable member into the movement of the Z-axis movable member in the Z-axis direction.

(21) According to a twenty-first feature of the present invention that includes the nineteenth feature (19), the first member comprises a stationary member, the second member comprises a Y-axis movable member which is movable relative to the stationary member in a Y-axis direction parallel to a straight reference line, the third member comprises an X-axis movable member which is movable relative to the Y-axis movable member in an X-axis direction perpendicular to the Y-axis direction, and the fourth member comprises a rotatable member which is rotatable relative to the X-axis movable member.

(22) According to a twenty-second feature of the present invention that includes the first feature (1), the first member comprises a stationary member, the second member comprises a movable member which is supported by the stationary member such that the movable member is movable relative to the stationary member, the third member comprises a rotatable member which is supported by the movable member such that the rotatable member is rotatable, and is not movable, relative to the movable member, the mechanically motion-transmitting device comprises a first motion-transmitting device which is provided between the stationary member and the movable member and which transmits the motion of the output member of the first drive source to the movable member to move the movable member relative to the stationary member, and a second motion-transmitting device which is connected to the output member of the second drive source and to the rotatable member and which transmits the motion of the output member of the second drive source to the rotatable member while allowing the movable member to be moved relative to the stationary member, and the displacement control device comprises a cooperation control device which is connected to at least the second drive source and which controls the second drive source to cooperate with the first drive source to cause the rotatable member to do a displacement equal to a sum of the movement of the movable member relative to the stationary member and the rotation of the rotatable member relative to the movable member. The movable member may be movable relative to the stationary member in a certain direction or in each of a plurality of directions which intersect each other. In the latter case, the first motion-transmitting device may be one which includes a plurality of motion-transmitting devices which are operable independent of each other. The rotatable member may be an end displaceable member, or the rotation of the rotatable member may be further converted into a different displacement of another displaceable member. The present displacing apparatus can cause the movable member to move and cause the rotatable member to move and rotate.

(23) According to a twenty-third feature of the present invention that includes the first feature (1), the first member comprises a stationary member, the second member comprises a movable member which is supported by the stationary member such that the movable member is movable relative to the stationary member, the third member comprises a displaceable member which is supported by the movable member such that the displaceable member is displaceable relative to the movable member, the mechanically motion-transmitting device comprises a first drive rotatable member and a second drive rotatable member which are supported by the stationary member such that each of the first and second drive rotatable members is not movable relative to the stationary member; a plurality of movable-member-side driven rotatable members which are supported by the movable member such that each of the movable-member-side driven rotatable members is rotatable, and not movable, relative to the movable member; at least one displaceable-member-side driven rotatable member which is supported by the displaceable member; a one-turn wound-on member which is wound, in one turn, on the first and second drive rotatable members, the movable-member-side driven rotatable members, and the displaceable-member-side driven rotatable member, without slack, and which allows the movable member to be moved relative to the stationary member and allows the displaceable member to be displaced relative to the movable member, the first drive source and the second drive source drive the first drive rotatable member and the second drive rotatable member, respectively, independent of each other, and the displacement control device controls the first and second drive sources to cooperate with each other to cause the movable member to be moved relative to the stationary member and cause the displaceable member to be displaced relative to the movable member. The displacing apparatus according to the fifteenth feature (15) may employ, as the second wound-on member thereof, the one-turn wound-on member of the present displacing apparatus. More specifically described, the one-turn wound-on member as the second wound-on member may be wound on the first and second drive wheels as the first and second drive rotatable members, the second driven wheels as the movable-member-side driven rotatable members, and the third driven member as the displaceable-member-side driven rotatable member, without slack, while allowing the second member as the movable member to be moved relative to the first member as the stationary member and allowing the third member as the displaceable member to be displaced relative to the movable member. The first cooperation control device as the cooperation control device controls the first and second drive sources and thereby arbitrarily controls the displacement of the third member relative to the second member. Since the second wound-on member is wound on the first and second drive wheels distant from each other in the first direction, so as to have the first portions extending in the first direction, the second wound-on member can allow, without being slacked, the second member to be moved relative to the first member in the first direction. The displaceable member as the third member of the present displacing apparatus may be another movable member which is movable in a direction different from a direction in which the movable member as the second member is moved, or a rotatable member which is rotatable relative to the movable member as the second member. The feature that a wound-on member is not slacked when a movable member is moved or a displaceable member is displaced may be assured if the wound-on member has a plurality of portions extending in a direction in which two successive rotatable members on which the wound-on member is successively wound on are moved toward, and away from, each other (in the case where the two rotatable members are moved toward, and away from, each other in a plurality of directions, the wound-on member has a plurality of portions extending in each of the plurality of directions), and the wound-on member has an odd number of portions which extend from the movable member in a direction in which the movable member is moved, and has a same number of portion or portions on each side of the movable member.

(24) According to a twenty-fourth feature of the present invention, there is provided an apparatus for displacing at least two displaceable members, comprising a stationary member; the at least two displaceable members comprising a movable member which is supported by the stationary member such that the movable member is movable relative to the stationary member, and a rotatable member which is supported by the movable member such that the rotatable member is rotatable, and is not movable, relative to the movable member; at least two drive sources including a first drive source and a second drive source which have respective output members and each of which is not movable relative to the stationary member; a first motion-transmitting device which is provided between the stationary member and the movable member and which transmits motion of the output member of the first drive source to the movable member to move the movable member relative to the stationary member; a second motion-transmitting device which is connected to the output member of the second drive source and to the rotatable member and which transmits motion of the output member of the second drive source to the rotatable member while allowing the movable member to be moved relative to the stationary member; and a cooperation control device which is connected to at least the second drive source and which controls the second drive source to cooperate with the first drive source to cause the rotatable member to do a displacement equal to a sum of the movement of the movable member relative to the stationary member and the rotation of the rotatable member relative to the movable member. The movable member may be movable relative to the stationary member in a single direction or in each of a plurality of directions which intersect each other. In the latter case, preferably, the first motion-transmitting device is provided by the mechanically motion-transmitting device of the displacing apparatus according to the first feature (1). However, the first motion-transmitting device may be provided by one which includes a plurality of motion-transmitting devices which are operable independent of each other. The rotatable member may be an end displaceable member, or the rotation of the rotatable member may be further converted into a different displacement of another displaceable member. The present displacing apparatus can cause the movable member to move and cause the rotatable member to move and rotate.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

First, there will be described a moving apparatus to which the present invention is applied, by reference to FIGS. 1 to 3.

Figure 1:
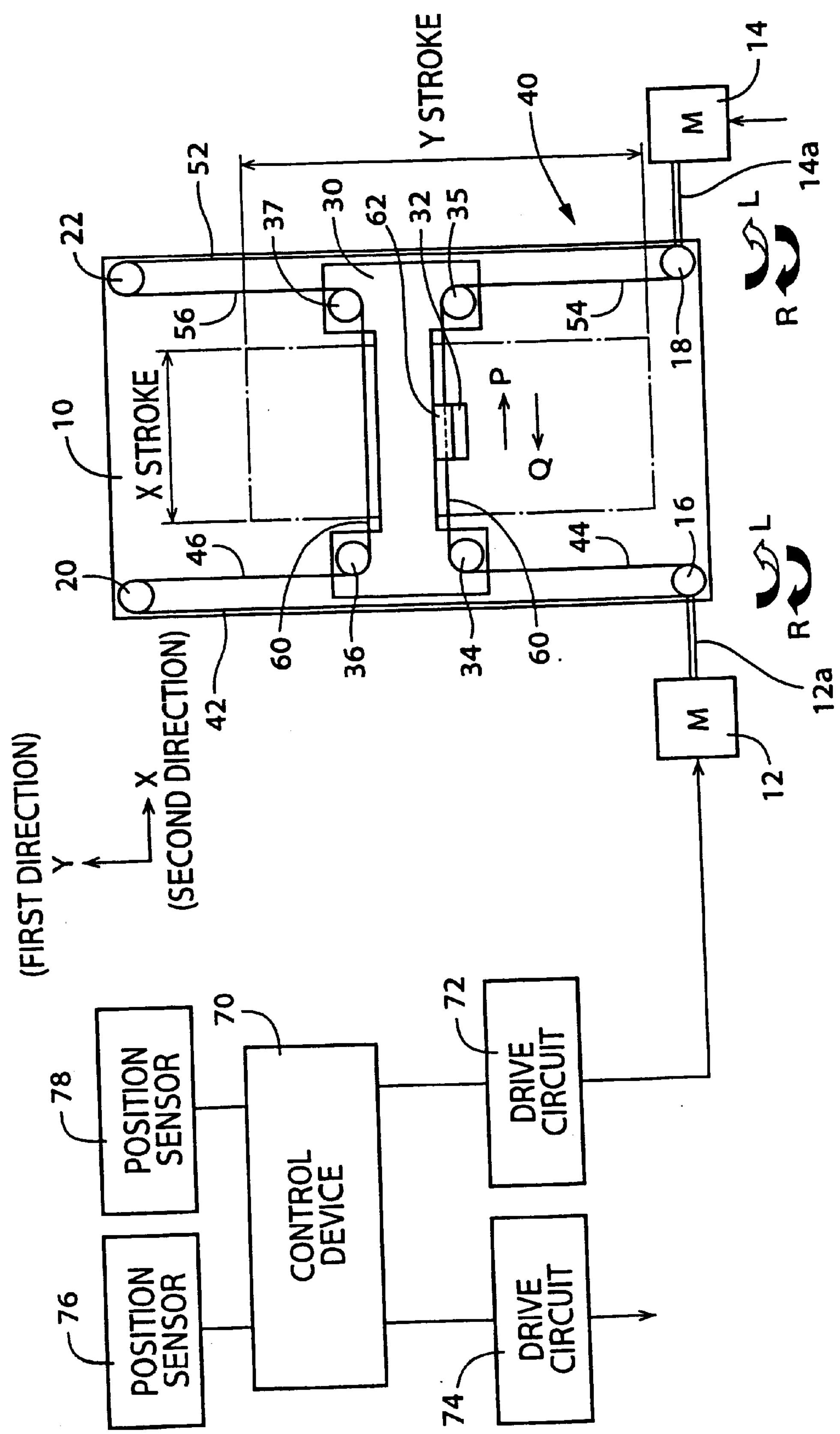
FIG. 1 is a schematic plan view of a moving apparatus as a first embodiment of the present invention.

In FIG. 1, reference numeral 10 designates a stationary, base member of the present moving apparatus, and reference numerals 12, 14 designate a first and a second drive motor as two drive sources that are associated with the base member 10 such that each of the two drive motors 12, 14 is not movable relative to the base member 10. An upper surface of the base member 10 defines an X-Y coordinate plane having an Y-axis direction as a first direction and an X-axis direction as a second direction. Each of the two drive motors 12, 14 is rotatable in opposite directions, i.e., a forward and a backward direction. The two drive motors 12, 14 are distant from each other in the X-axis direction. A first and a second drive wheel 16, 18 are provided on the base member 10 such that the two drive wheels 16, 18 are distant from each other in the X-axis direction, and are attached to respective output shafts 12*a*, 14*a* of the first and second drive motors 12, 14, respectively, such that each of the two drive wheels 16, 18 is not rotatable relative to a corresponding one of the two drive motors 12, 14. When each of the drive motors 12, 14 is driven or rotated, a corresponding one of the two drive wheels 16, 18 is rotated. A first and a second driven wheel 20, 22 are also provided on the base member 10 such that each of the two driven wheels 20, 22 is opposed to a corresponding one of the two drive wheels 16, 18 in the Y-axis direction, that is, the first driven wheel 20 is opposed to the first drive wheel 16 and the second driven wheel 22 is opposed to the second drive wheel 18. Each of the drive wheels 16, 18 and the driven wheels 20, 22 is rotatable about a Z axis which is perpendicular to each of the X and Y axes of the X-Y coordinate plane. In the present embodiment, the four wheels 16, 18, 20, 22 has a same size and a same diameter. Hereinafter, the driven wheels 20, 22 provided on the base member 10 will be referred to as the "base-member-side" driven wheels 20, 22.

On the base member 10, there is also provided a first movable member 30 which is movable relative to the base member 10 in the Y-axis direction. A second movable member 32 is supported by the first movable member 30, such that the second movable member 32 is movable relative to the first movable member 30 in the X-axis direction. More specifically described, four driven wheels 34, 35, 36, 37 are provided on the first movable member 30, such that each of the driven wheels 34–37 is rotatable about a Z axis. Hereinafter, the driven wheels 34–37 provided on the first movable member 30 will be referred to as the "movable-member-side" driven wheels 34–37. Since the second movable member 32 includes a support portion for supporting an electric-component holder (not shown) which holds an electric component, the present moving apparatus can be used as an apparatus for moving an electric-component holder.

In the present embodiment, as shown in FIG. 1, a flat belt 40 as a wound-on member is wound on the drive wheels 16, 18, the base-member-side driven wheels 20, 22, and the movable-member-side driven wheels 34–37. The two drive wheels 16, 18 and the two base-member-side driven wheels 20, 22 are next to the four movable-member-side driven wheels 34, 35, 36, 37, respectively, along the flat belt 40. That is, the two drive wheels 16, 18 are not next to each other, or the two base-member-side driven wheels 20, 22 are not next to each other, along the flat belt 40. The flat belt 40 includes six portions which extend parallel to one another in the Y-axis direction. That is, on the side of the drive wheel 16, a portion 42 of the belt 40 between the drive wheel 16 and the base-member-side driven wheel 20, a portion 44 between the drive wheel 16 and the movable-member-side driven wheel 34, and a portion 46 between the base-member-side driven wheel 20 and the movable-member-side driven wheel 36 are parallel to one another; and on the side of the drive wheel 18, a portion 52 of the belt 40 between the drive wheel 18 and the base-member-side driven wheel 22, a portion 54 between the drive wheel 18 and the movable-member-side driven wheel 35, and a portion 56 between the base-member-side driven wheel 22 and the movable-member-side driven wheel 37 are parallel to one another. In the present embodiment, each of the drive wheels 16, 18 and the driven wheels 20, 22, 34–37 is provided by a flat pulley corresponding to the flat belt 40.

Since the flat belt 40 extends between the two movable-member-side driven wheels 34, 35 distant from each other in the X-axis direction and between the other two movable-member-side driven wheels 36, 37 distant from each other in the same direction, the belt 40 additionally includes two portions 60, 60 which extend parallel to each other in the X-axis direction. Since the two movable-member-side driven wheels 34 and 35 are distant from each other in the X-axis direction, i.e., the second direction and the other two movable-member-side driven wheels 36, 37 are distant from each other in the same direction, the first movable member 30, even if it may be long in the second direction, can be driven at its opposite end portions as seen in its lengthwise direction, i.e., the second direction, so that the first movable member 30 can be moved accurately in the first direction perpendicular to the second direction.

One of the two portions 60 of the flat belt 40 that extend in the X-axis direction supports a well-known connecting device 62 as an engaging device as a sort of associating device that directly connects the second movable member 32 to the one portion 60 such that the second movable member 32 is not movable relative to the portion 60. Since the second movable member 32 is fixed to the flat belt 40 by the connecting device 62, the second movable member 32 is, when the flat belt 40 is moved, moved in the X-axis direction, i.e., the second direction, at the same velocity as that at which the belt 40 is moved. Thus, the connecting device 62 is a sort of same-velocity-type engaging device which engages the second movable member 32 with the flat belt 40 such that the second movable member 32 is moved at the same velocity as that at which the belt 40 is moved.

The first and second drive motors 12, 14 are connected to a control device 70 via a first and a second drive circuit 72, 74, respectively. A first and a second position sensor 76, 78 which detect respective current positions of the second movable member 32 in the Y-axis and X-axis directions, are connected to an input portion of the control device 70. The control device 70 controls the two drive motors 12, 14, based on the current Y-axis and X-axis positions of the second movable member 32. The first position sensor 76 is a linear scale such as a magnetic scale (e.g., available under the commercial name "Magnescale") that detects a current position of the first movable member 30 relative to the base member 10 in the Y-axis direction, and the second position sensor 78 is an identical linear scale that detects a current position of the second movable member 32 relative to the first movable member 30 in the X-axis direction. From respective detection signals supplied from the two position sensors 76, 78, the control device 70 can determine the current positions of the second movable member 32 in the X-axis and Y-axis directions.

Hereinafter, there will be described the manner in which the two drive motors 12, 14 are controlled by the control device 70. As described above, the two drive wheels 16, 18 have the same diameter, and are attached to the respective output shafts **12*a*, 14*a* of the two drive motors 12, 14 such that each of the drive wheels 16, 18 is not rotatable relative to a corresponding one of the output shafts of the drive motors 12, 14. Therefore, each of the two drive wheels 16, 18 is rotated at the same rotation velocity as that at which a corresponding one of the two drive motors 12, 14 is rotated, in the same direction as that in which the corresponding one drive motor 12, 14 is rotated. Thus, the rotation velocity of each of the two drive wheels 16, 18 can be controlled by controlling the rotation velocity of a corresponding one of the two drive motors 12, 14**.

As shown in FIG. 1, in the case where the two drive motors 12, 14 are rotated at a same velocity in a same direction, all of the drive wheels 16, 18, the base-member-side driven wheels 20, 22, and the movable-member-side driven wheels 34–37 are rotated in a same direction. Since the distance between the wheel 34 and the wheel 16, the distance between the wheel 35 and the wheel 18, the distance between the wheel 36 and the wheel 20, or the distance between the wheel 37 and the wheel 22 does not change, so that the first movable member 30 is not moved in the Y-axis direction and only the flat belt 40 is moved in the X-axis direction. Thus, the second movable member 32 is moved relative to the first movable member 30 in the X-axis direction only. That is, the second movable member 32 is moved relative to the base member 10 in the second direction only.

If the two drive motors 12, 14 are rotated at a same velocity in a counterclockwise or left direction, L, the two drive wheels 16, 18 are rotated at a same velocity in the left direction L and the flat belt 40 is moved in a direction indicated at arrow, P, so that the second movable member 32 is moved in the direction P. On the contrary, if the two drive motors 12, 14 are rotated in a clockwise or right direction, R, the second movable member 32 is moved in a direction indicated at arrow, Q.

Figure 2:
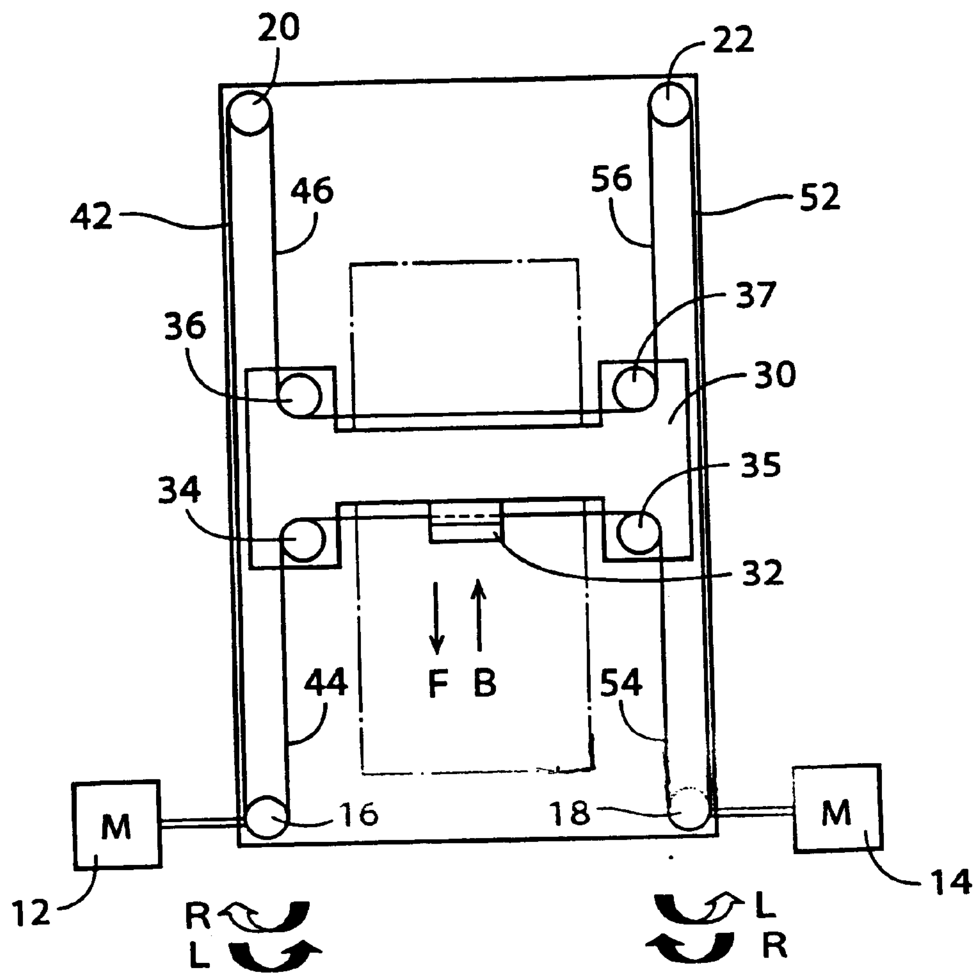
FIG. 2 is a plan view for explaining an operation of the apparatus of FIG. 1.

As shown in FIG. 2, in the case where the two drive motors 12, 14 are rotated at a same velocity, but in opposite directions, respectively, the distance between the wheel 34 and the wheel 16 and the distance between the wheel 35 and the wheel 18 increase, or decrease, by a same distance, and the distance between the wheel 36 and the wheel 20 and the distance between the wheel 37 and the wheel 22 decrease, or increase, by the same distance as that by which the above-indicated first two distances increase or decrease. That is, if the first two distances increase, then the second two distances decrease, and vice versa. Accordingly, the first movable member 30 is moved relative to the base member 10 in the Y-axis direction. However, the second movable member 32 is not moved relative to the first movable member 30. Thus, the second movable member 32 is moved relative to the base member 10 in the first direction only. Since the six portions 42, 44, 46, 52, 54, 56 of the flat belt 40 that extend in the Y-axis direction are parallel to one another, the flat belt 40 is not loosened nor stretched as the first movable member 30 is moved in the first direction.

If the two drive motors 12, 14 are rotated at a same velocity, but in the right direction R and the left direction L, respectively, the drive wheel 16 is rotated in the right direction R and the drive wheel 18 is rotated in the left direction L, so that the first movable member 30 is moved in a direction indicated at arrow, F. On the contrary, if the two drive motors 12, 14 are rotated at a same velocity, but in the left direction L and the right direction R, respectively, the drive wheel 16 is rotated in the left direction L and the drive wheel 18 is rotated in the right direction R, so that the first movable member 30 is moved in a direction indicated at arrow, B. In the case where the first movable member 30 is moved in the direction F, the two portions 44,54 of the flat belt 40 are shortened and the two portions 46, 56 of the same 40 are lengthened by the same distance as that by which the two portions 44, 54 are shortened. Thus, the flat belt 40 is nor loosened or stretched as the first movable member 30 is moved in the Y-axis or first direction. This is true with the case where the first movable member 30 is moved in the direction B. That is, the two portions 44, 54 are lengthened and the two portions 44, 56 are shortened by the same distance as that by which the two portions 44, 54 are lengthened.

Figure 3:
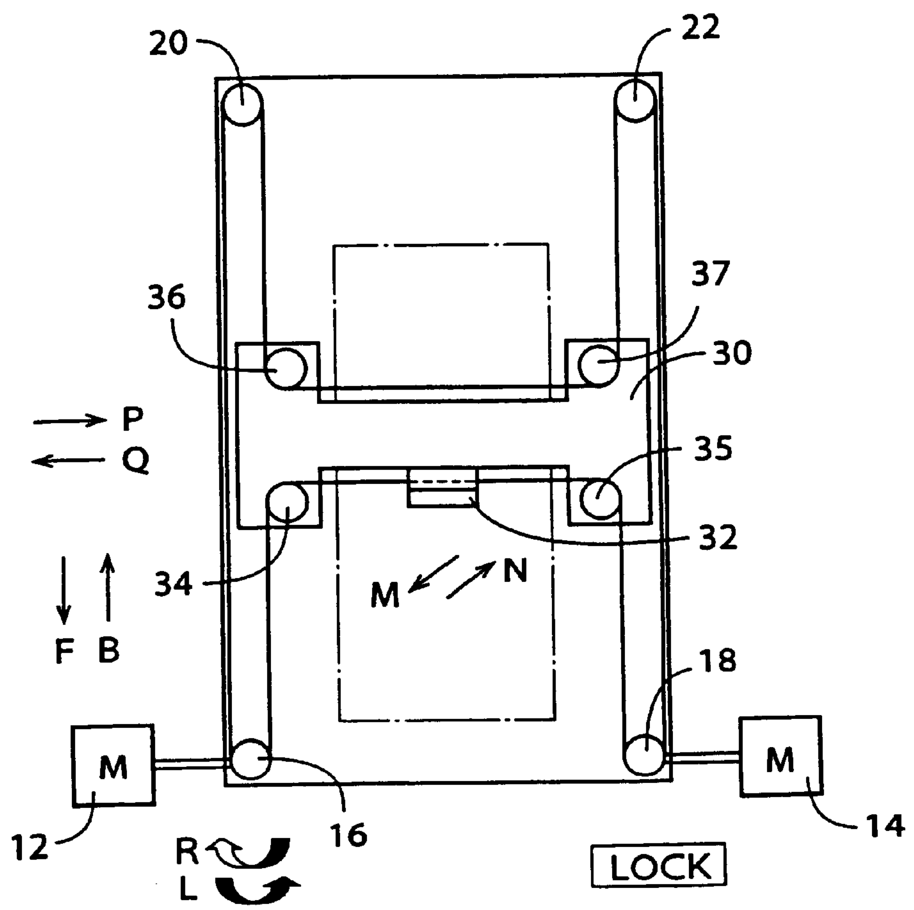
FIG. 3 is a plan view for explaining another operation of the apparatus of FIG. 1.

As shown in FIG. 3, when the two drive motors 12, 14 are rotated at different velocities, the above-indicated two sorts of movement simultaneously occur, that is, both the first and second movable members 30, 32 are moved. The second movable member 32 is moved with the first movable member 30, relative to the base member 10, in the Y-axis direction, and is simultaneously moved relative to the first movable member 30 in the X-axis direction. In short, the second movable member 32 is moved relative to the base member 10 in an inclined direction having a first component parallel to the X-axis direction and a second component parallel to the Y-axis direction. The inclined direction of movement of the second movable member 32 can be freely changed by controlling or changing the direction and velocity in and at which each of the two drive motors 12, 14 is rotated.

If the drive motor 12 is rotated in the right direction R and the drive motor 14 is not rotated, that is, locked, the first movable member 30 is moved in the direction F and the second movable member 32 is moved relative to the first member 30 in the direction Q, so that the second member 32 is moved relative to the base member 10 in a direction indicated at arrow, M. If the drive motor 12 is rotated in the left direction L and the drive motor 14 is locked, the first member 30 is moved in the direction B and the second member 32 is moved relative to the first member 30 in the direction P, so that the second member 32 is moved relative to the base member 10 in a direction indicated at arrow, N.

In the case where the second movable member 32 is moved in the direction M, N, the ratio of the distance of movement of the second member 32 in the Y-axis direction to the distance of movement of the same 32 in the X-axis direction is ½=0.5.

Thus, in the present embodiment, the two drive motors 12, 14 can be so controlled by the control device 70 as to move the second movable member 32 relative to the base member 10, to an arbitrary position on the X-Y coordinate plane, that is, move the electric-component holder attached to the second member 32 to an arbitrary position on the X-Y coordinate plane. The second member 32 is movable in a movement area indicated at one-dot chain line in FIG. 1.

Since the two drive motors 12, 14 are not movable relative to the stationary, base member 10, the present moving apparatus is free from the problems that have been experienced by the conventional moving apparatus in which cables and/or hoses are dragged by a movable member when the movable member is moved. Since the cables and/or hoses of the present moving apparatus do not interfere with an operator, the present apparatus can enjoy improved ease of use. In addition, since it is not needed to cover or protect the cables and/or hoses, the present apparatus can be disposed in a reduced space. Moreover, since the cables and/or hoses are not worn or cut, the present apparatus can enjoy improved reliability and safety and can be easily maintained.

In addition, since the two position sensors 76, 78 are employed, the present moving apparatus can detect the current positions of the second movable member 32. Although the flat belt 40 is employed as the wound-on member, the current positions of the second member 32 can be detected with accuracy.

In the illustrated embodiment, the respective output shafts 12*a*, 14*a* of the two drive motors 12, 14 are connected to the two base-member-side wheels 16, 18, respectively. However, the two drive motors 12, 14 may be connected to the two base-member-side wheels 20, 22, respectively, the two base-member-side wheels 16, 22, respectively, or the two base-member-side wheels 18, 20, respectively. That is, the two drive wheels may be disposed at two diagonal positions, respectively, so long as the two drive wheels are distant from each other in the X-axis direction. It is not needed to fix the two drive wheels to the respective output shafts of the two drive motors 12, 14, such that each of the two drive wheels is not rotatable relative to a corresponding one of the respective output shafts of the two drive motors 12, 14. For example, the two drive wheels may be connected to the respective output shafts of the two drive motors 12, 14, via respective gear devices. In the last case, the rotation of each of the two drive motors 12, 14 is transmitted to a corresponding one of the two drive wheels, such that the velocity of rotation of the each drive motor 12, 14 is changed by a corresponding one of the two gear devices.

In the illustrated embodiment, the second movable member 32 is movable on the X-Y coordinate plane. However, in the case where the base member 10 is disposed such that the base member 10 extends parallel to an X-Z coordinate plane or a Y-Z coordinate plane, the second member 32 may be adapted to be movable on the X-Z coordinate plane or the Y-Z coordinate plane.

The flat belt 40 employed as the wound-on member may be replaced with a timing belt, a chain, etc., and the base-member-side wheels and the movable-member-side driven wheels may be replaced with wheels which have respective shapes corresponding to the shape of the wound-on member. In the case where the wound-on member is provided by a timing belt or a chain, the wound-on member can reliably transmit the rotation of each of the drive motors 12, 14 to all the wheels. Accordingly, the linear scales employed as the position sensors 76, 78 may be replaced with encoders which are respectively incorporated by the drive motors 12, 14, for detecting the respective rotation velocities thereof. In the last case, the control device 70 can estimate or determine, based on the rotation velocities detected by the encoders, the current positions of the second movable member 32.

Figure 4:
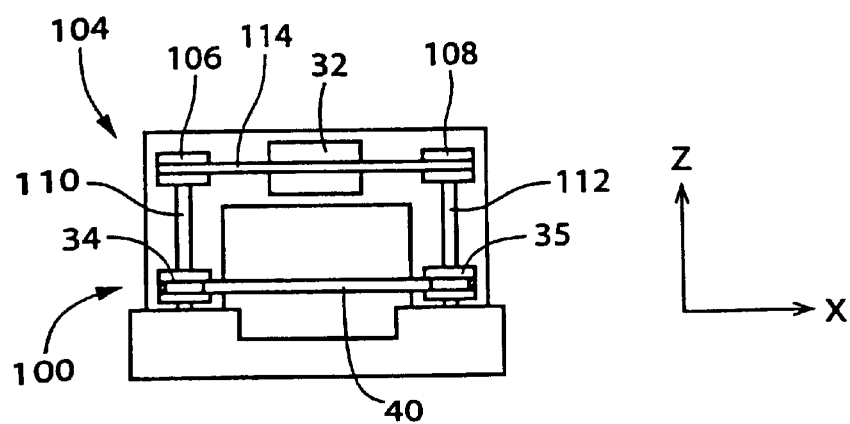
FIG. 4 is a side elevation view of a portion of another moving apparatus as a second embodiment of the present invention.

The connecting device 62 employed as the engaging device as a sort of associating device may be replaced with an indirect associating device 104 shown in FIG. 4. In this case, a first movable member 100 has a thickness in a Z-axis direction perpendicular to the X-axis and Y-axis directions, and respective positions where the movable-member-side driven wheels 34, 35, 36, 37 are provided, are distant in the Z-axis direction from a position where the second movable member 32 is provided. The movement of the flat belt 40 is transmitted to the second movable member 32 via the indirect associating device 104.

The indirect associating device 104 includes two second-movable-member driven wheels 106, 108; two transmission rods 110, 112 which transmit the respective rotations of the two movable-member-side driven wheels 34, 35 to the two second-movable-member driven wheels 106, 108; a flat belt 114 as a wound-on member that is wound on the two second-movable-member driven wheels 106, 108; and a well-known connecting device (not shown) which connects the second movable member 32 to the flat belt 114. When the movable-member-side driven wheels 34, 35 are rotated, the second-movable-member driven wheels 106, 108 are rotated, so that the flat belt 114 is moved and the second movable member 32 is moved in the X-axis direction.

Thus, owing to the indirect associating device 104, the second movable member 32 can be moved in the X-axis direction even though the second member 32 may be provided at a position distant from the movable-member-side driven wheels 34, 35 in the Z-axis direction.

In each of the first embodiment shown in FIGS. 1 to 3 and the second embodiment shown in FIG. 4, the four movable-member-side driven wheels 34–37 are provided on the first movable member 30. However, it is not essentially needed to employ the four movable-member-side driven wheels, and it is possible to employ at least one movable-member-side driven wheel, as shown in FIGS. 5 and 6.

Figure 5:
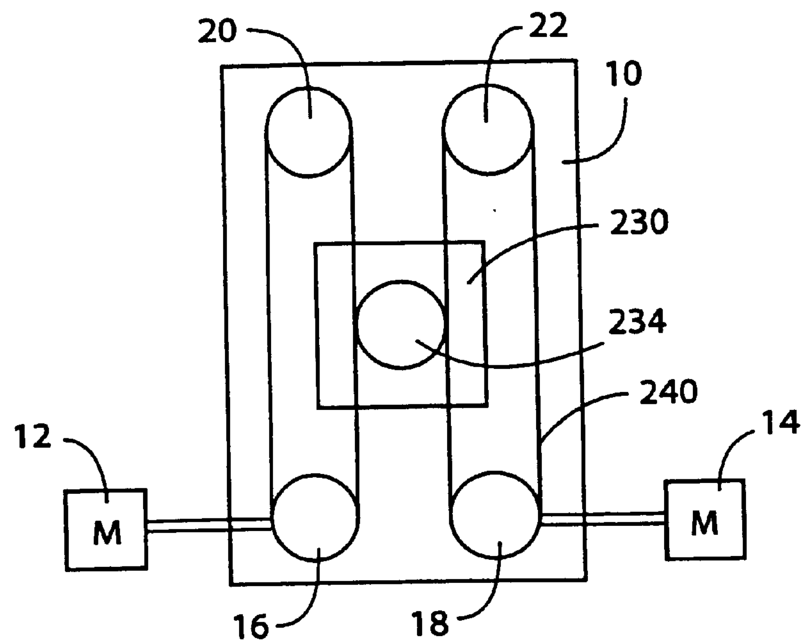
FIG. 5 is a schematic plan view of another moving apparatus as a third embodiment of the present invention.

In a moving apparatus shown in FIG. 5, a single movable-member-side driven wheel 234 is provided on a first movable member 230, and a wound-on member 240 is wound on the drive wheels 16, 18, the base-member-side driven wheels 20, 22, and the movable-member-side driven wheel 234. An indirect associating device (not shown) is provided on the movable-member-side driven wheel 234, and transmits the movement of the wound-on member 240 to a second movable member (not shown).

When the two drive motors 12, 14 are rotated in a same direction at a same velocity, the movable-member-side driven wheel 234 is rotated, and the indirect associating device transmits the rotation of the wheel 234 to the second movable member, so that the second movable member is moved in the X-axis direction. When the two drive motors 12, 14 are rotated in opposite directions at a same velocity (i.e., at a same absolute value of velocity), respective portions of the wound-on member 240 between the drive wheels 16, 18 and the movable-member-side wheel 234 are lengthened, or shortened, and respective portions of the wound-on member 240 between the base-member-side driven wheels 20, 22 and the movable-member-side wheel 234 are simultaneously shortened, or lengthened. Therefore, the first movable member 230 is moved in the Y-axis direction. When the two drive motors 12, 14 are rotated in different velocities (i.e., different absolute values of velocity), the second movable member is moved in an direction inclined with respect to each of the X-axis and Y-axis directions.

Figure 6:
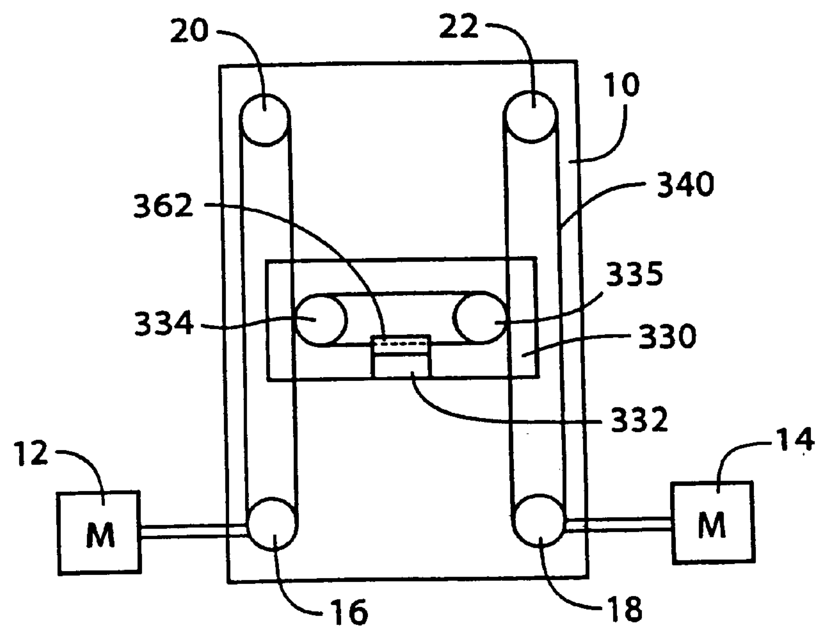
FIG. 6 is a schematic plan view of another moving apparatus as a fourth embodiment of the present invention.

In a moving apparatus shown in FIG. 6, two movable-member-side driven wheel 334, 335 are provided on a first movable member 330, such that the two wheels 334, 335 are distant from each other in the X-axis direction, and a wound-on member 340 is wound on the drive wheels 16, 18, the base-member-side driven wheels 20, 22, and the movable-member-side driven wheels 334, 335. A connecting device 362 as an associating device is attached to one of two portions of the wound-on member 340 between the two movable-member-side driven wheels 334, 335, and connects a second movable member 332 to the wound-on member 340, so that the second movable member 332 is moved relative to the first movable member 330 in the X-axis direction.

Like in each of the first to third embodiments shown in FIGS. 1 to 5, the two drive motors 12, 14 can be controlled by the control device 70 to move the second movable member 332 relative to the base member 10 in the X-axis direction, the Y-axis direction, or any inclined direction.

In each of the third and fourth embodiments shown in FIGS. 5 and 6, it is possible to employ an indirect associating device which associates a second displaceable member to the wound-on member 240, 340 such that the second displaceable member is displaceable in a direction other than the second direction. For example, the rotations of the drive motors 12, 14, or the movement of the wound-on belt 240, 340, that are or is transmitted by the indirect associating device may be utilized to move the second displaceable member in the Z-axis direction perpendicular to the X-axis and Y-axis directions, and/or rotate the second displaceable member about a Z axis perpendicular to the X and Y axes.

Alternatively, another drive source and another or independent wound-on member may be additionally employed to move a second movable member in three or more directions as indicated above.

The four moving apparatuses illustrated in FIGS. 1 to 6 may be used to move a device or member other than the electric-component holder, such as an image taking device or an adhesive dispenser. Each of the electric-component holder, the image taking device, and the adhesive dispenser may provide the second movable member 32.

In each of the four illustrated embodiments, the base member 10 may be provided with a guide device which extends parallel to the Y-axis direction and guides the movement of the first movable member in the Y-axis direction. The guide device is particularly advantageous in the case where the first movable member is elongate in the X-axis direction.

Figure 7:
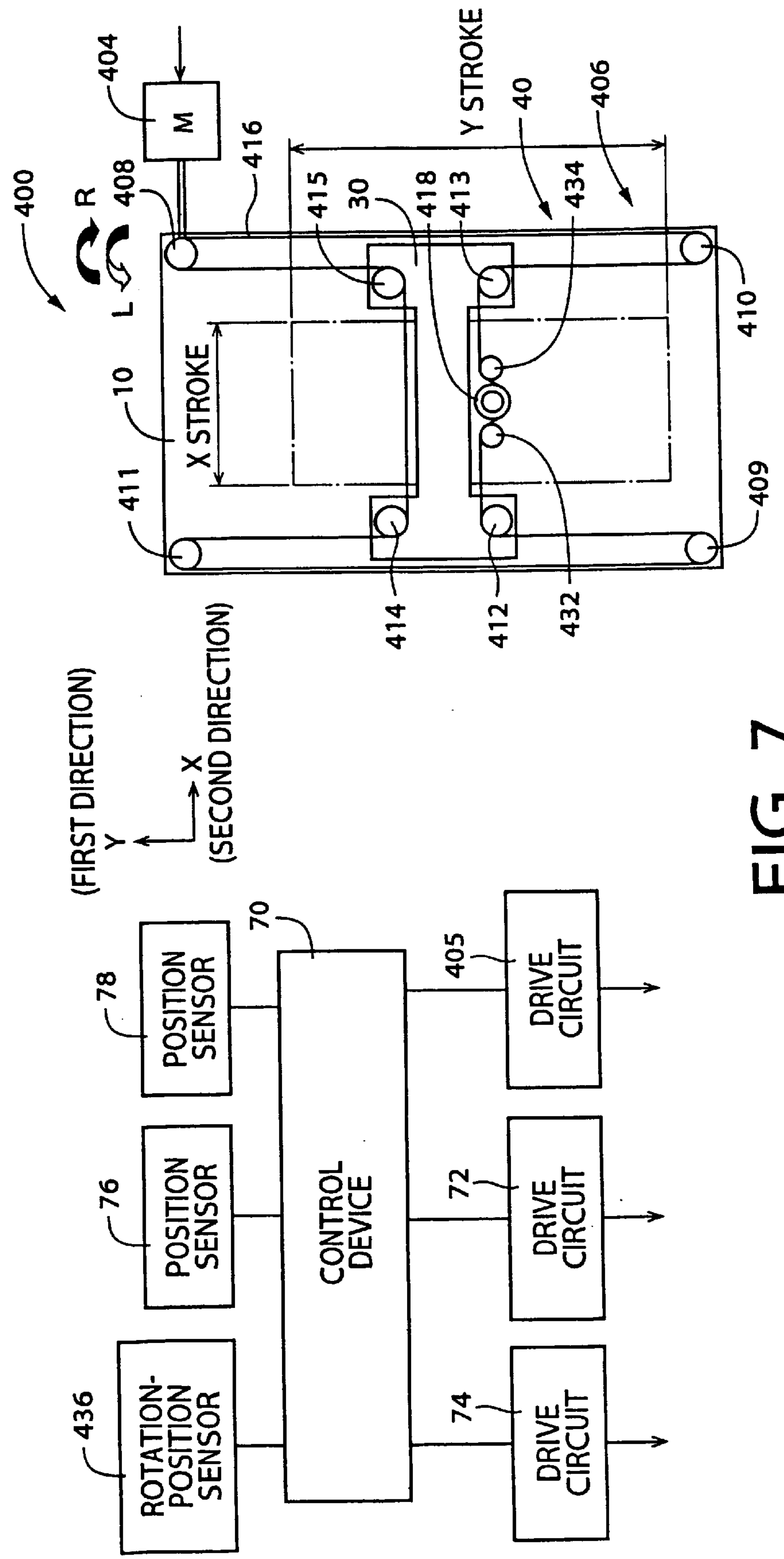
FIG. 7 is a schematic plan view of a displacing apparatus as a fifth embodiment of the present invention.
Figure 8:
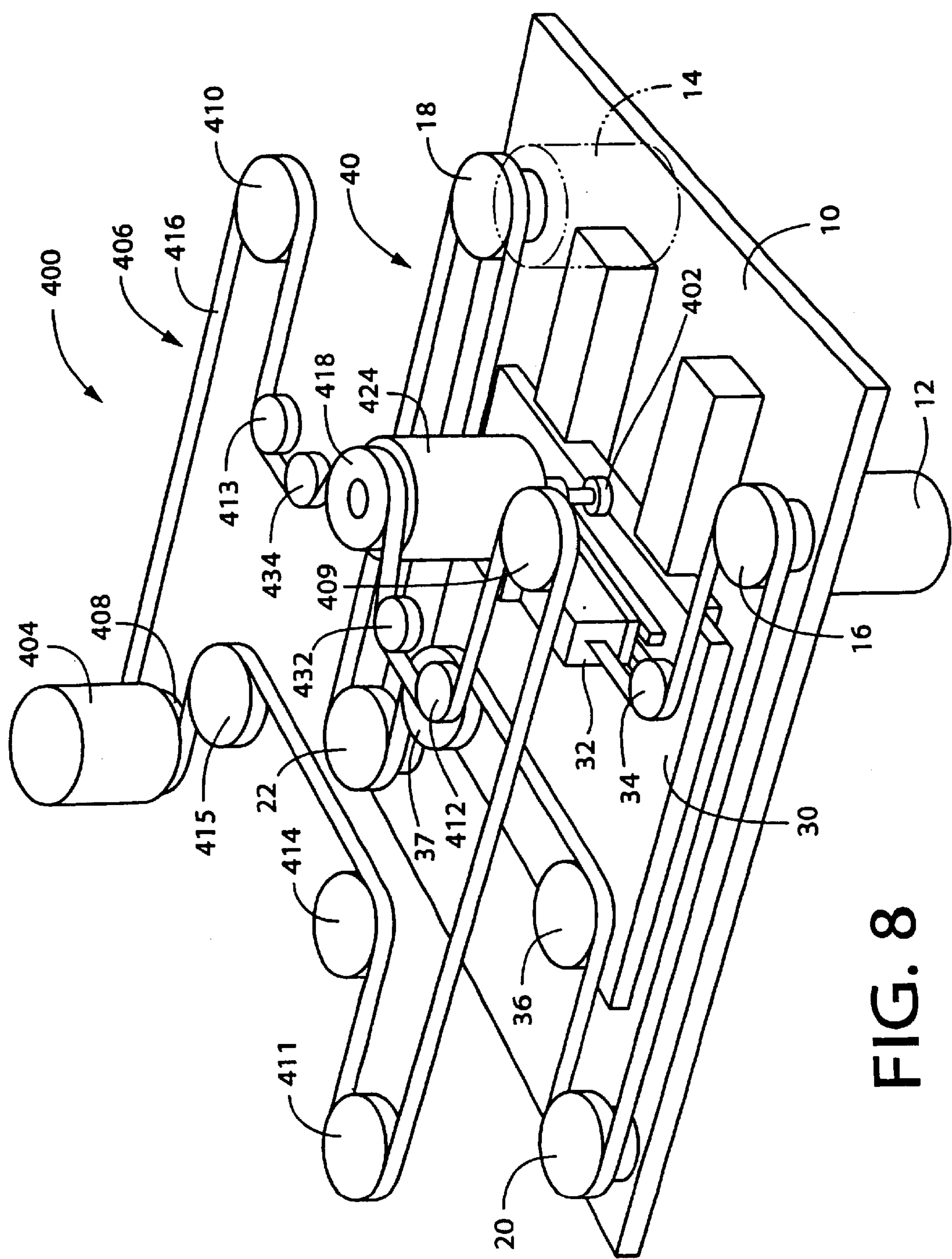
FIG. 8 is a perspective view of the apparatus of FIG. 7.
Figure 9:
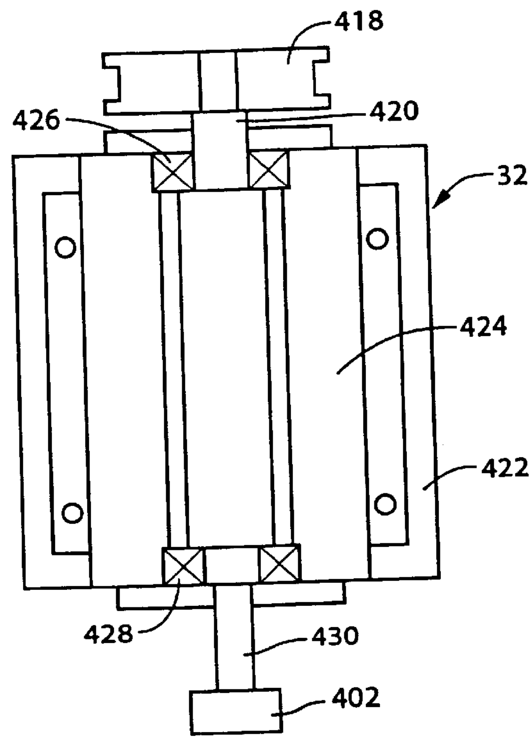
FIG. 9 is a front elevation, cross-sectioned view of a portion of the apparatus of FIG. 7.

FIGS. 7, 8, and 9 schematically illustrate a displacing apparatus 400 as a fifth embodiment of the present invention. The displacing apparatus 400 is identical with the first to fourth moving apparatuses shown in FIGS. 1 to 6, in that the first movable member 30 is movable relative to the base member 10 in the Y-axis direction and the second movable member 32 is movable relative to the first movable member 30 in the second direction. However, as shown in FIG. 8, the displacing apparatus 400 differs from the first to fourth apparatuses, in that the displacing apparatus 400 additionally includes a rotatable member 402 as a third movable member that is provided on the second movable member 32 such that the rotatable member 402 is rotatable about an axis line parallel to the Z-axis direction perpendicular to the X-axis and Y-axis directions. In addition, the displacing apparatus 400 includes, in addition to the two drive motors 12, 14, a third drive motor 404 whose rotation is transmitted to the rotatable member 402 so that the rotatable member 402 is rotated about the axis line parallel to the Z-axis direction. Hereinafter, the rotatable member 402, and a third-drive-force transmitting device 406 which transmits the drive force of the third drive motor 404 to the rotatable member 402 will be described in detail below.

The base member 10 supports a third drive wheel 408 which is provided at a position which is aligned, in the X-axis and Y-axis directions, with one of respective positions where the two drive wheels 16, 18 and the two base-member-side driven wheels 20, 22 are provided on the base member 10, and which is distant from the one position in the Z-axis direction as a third direction that is perpendicular to the Y-axis direction as the first direction and to the X-axis direction as the second direction. The third drive wheel 408 is rotatable relative to the base member 10 about an axis line parallel to the Z-axis direction, and is coupled with the third drive motor 404. As shown in FIG. 7, the third drive motor 404 is connected to the control device 70 via a drive circuit 405, and the control device 70 controls the direction of rotation of the third drive wheel 408 and the amount of rotation of the same 408 in each of the opposite directions.

The base member 10 supports three base-member-side driven wheels 409, 410, 411 which are respectively coaxial with the other three wheels of the above-indicated four wheels 16, 18, 20, 22 than the above-indicated one wheel aligned with the third drive wheel 408, and each of which is rotatable relative to the base member 10 about an axis line parallel to the Z-axis direction. In addition, the first movable member 30 supports four movable-member-side driven wheels 412, 413, 414, 415 which are coaxial with the four movable-member-side driven wheels 34, 35, 36, 37, respectively, and each of which is rotatable relative to the first movable member 30 about an axis line parallel to the Z-axis direction. A flat belt 416 as a second wound-on member independent of the flat belt 40 as a first wound-on member is wound on the third drive wheel 408, the three base-member-side driven wheels 409–411, and the four movable-member-side driven wheels 412–415.

As shown in FIG. 8, the flat belt 416 is provided at a position distant in the Z-axis direction from the position where the flat belt 40 transmits the drive forces to the first and second movable members 30, 32. The flat belt 416 extends in substantially the same shape as that in which the flat belt 40 extends. That is, a portion of the flat belt 416 that is located between the third drive wheel 408 and the base-member-side driven wheel 410, a portion of the belt 416 between the wheel 410 and the movable-member-side driven wheel 413, a portion of the belt 416 between the movable-member-side driven wheel 412 and the base-member-side driven wheel 409, a portion of the belt 416 between the wheel 409 and the base-member-side driven wheel 411, a portion of the belt 416 between the wheel 411 and the movable-member-side driven wheel 414, and a portion of the belt 416 between the movable-member-side driven wheel 415 and the third drive wheel 408 extend parallel to one another in the Y-axis direction, and a portion of the belt 416 between the movable-member-side driven wheels 412, 413 and a portion of the belt 416 between the movable-member-side driven wheels 414, 415 extend parallel to each another in the X-axis direction.

The portion of the flat belt 416 that is located between the movable-member-side driven wheels 412, 413 is wound on a flat pulley 418 which is provided on the second movable member 32. The flat pulley 418 rotates the rotatable member 402, based on the rotation of the third drive motor 404 and/or the movement of the second movable member 32 in the X-axis direction.

As shown in FIG. 9, a rotary axis member 420 projects vertically downward from the flat pulley 418, and is supported by the second movable member 32 such that the axis member 420 is rotatable relative to the second member 32. The rotatable member 402 is fixed to the rotary axis member 420 such that the rotatable member 402 is not rotatable relative to the axis member 420. The second movable member 32 has a vertical side surface 422 to which a housing 424 is attached, and the rotary axis member 420 is supported by the housing 424 via a pair of bearings 426, 428. The rotary axis member 420 includes a projecting end portion 430 which projects downward from the housing 424, away from the flat pulley 418, and the rotatable member 402 is coaxially attached to the end portion 430.

An electric-component holder may be directly attached to the rotary axis member 420. In this case, the electric-component holder provides the rotatable member 402. Alternatively, an electric-component holder may be attached to the rotatable member 402.

As shown in FIG. 8, the second movable member 32 supports two guide pulleys 432, 434 each of which has a diameter smaller than that of the flat pulley 418 and which are provided on both sides of the flat pulley 418 in the X-axis direction such that each of the guide pulleys 432, 434 is rotatable about a vertical axis line and guides the flat belt 416.

Like in the first to fourth embodiments shown in FIGS. 1 to 6, the current position of the first movable member 30 relative to the base member 10 and the current position of the second movable member 32 relative to the first movable member 30 are detected by the two position sensors 76, 78, respectively. Thus, the respective current positions of the second movable member 32 relative to the base member 10 in the X-axis and Y-axis directions are obtained. In addition, a rotation position of the rotary axis member 420 relative to the housing 424 or the second movable member 32 is detected by a rotation-position sensor 436 such as an encoder, and a detection signal representing the detected rotation position is supplied from the sensor 436 to the control device 70. The control device 70 controls, based on the X-axis-direction and Y-axis-direction positions and rotation position of the second movable member 32 detected by the three sensors 76, 78, 436, the first, second, and third drive motors 12, 14, 404 via the respective drive circuits 72, 74, 405, so that the second movable member 32 is positioned at desired X-axis-direction and Y-axis-direction positions and the rotatable member 402 is positioned at a desired rotation position.

Next, there will be described the operation of the displacing apparatus 400 constructed as described above.

Since the flat belt 416 includes the portions which extend in the Y-axis direction and the portions which extend in the X-axis direction, the belt 416 allows the rotatable member 402 to be moved together with the second movable member 32 in the X-axis direction and the Y-axis direction. However, since the movement of the second movable member 32 is transmitted to the flat pulley 418 via the flat belt 416, the rotatable member 402 is rotatable without needing the rotation of the third drive motor 404. Therefore, in the case where the rotation of the rotatable member 402 is controlled by the control device 70 by rotating the third drive motor 404, the control device 70 must take the amount or distance of movement of the second movable member 32 into account. Accordingly, the control device 70 is operable in each of (a) a simply moving manner in which the control device 70 controls the third drive motor 404 to rotate the third drive wheel 408 to move the flat belt 416 by an amount or distance corresponding to the amount or distance of movement of the second movable member 32, and thereby allows the second member 32 to be simply moved without causing any rotation of the rotatable member 402; (b) a simply rotating manner in which the control device 70 controls, while the second movable member 32 is kept still, the third drive motor 404 to rotate the third drive wheel 408 and thereby rotate the rotatable member 402; and (c) a moving and rotating manner in which the control device 70 allows the second member 32 to be moved, and controls the third drive motor 404 to rotate the third drive wheel 408 and thereby rotate the rotatable member 402. In the moving and rotating manner, the control device 70 can obtain both a desired movement of the second member 32 in a horizontal direction and a desired rotation of the rotatable member 402, without needing any rotation of the third drive motor 404, if the amount of desired rotation of the rotatable member 402 just corresponds to the amount of desired movement of the second member 32 in the horizontal direction.

The operation of the control device 70 in the above-indicated simply moving manner will be described in more detail below. If the second movable member 32 is moved in at least one of the X-axis and Y-axis directions, with the third drive wheel 408 being stopped or locked, a portion of the flat belt 416 that contacts the flat pulley 418 is moved relative to the pulley 418, so that the rotatable member 402 is rotated by an amount or angle corresponding to the amount or distance of relative movement of the portion of the belt 416. Therefore, in order to allow the second movable member 32 to be moved in a horizontal direction without allowing the rotatable member 402 to be rotated, it is needed to rotate the third drive wheel 408 in such a manner that the portion of the belt 416 is not moved relative to the pulley 418 when the second movable member 32 is moved in the horizontal direction. The distance of movement of the portion of the belt 416 relative to the pulley 418 in the state in which the wheel 408 is locked, corresponds to the distance of movement of the second member 32 in the horizontal direction and the positive or negative (i.e., forward or backward)

direction of the horizontal direction. This is true with each of the above-indicated simply rotating manner and the moving and rotating manner. That is, in each of the above-indicated three manners (a), (b), and (c), the amount, and direction, of rotation of the rotatable member 402 can be controlled based on the distance of movement of the portion of the flat belt 436 relative to the flat pulley 418.

Figure 10:
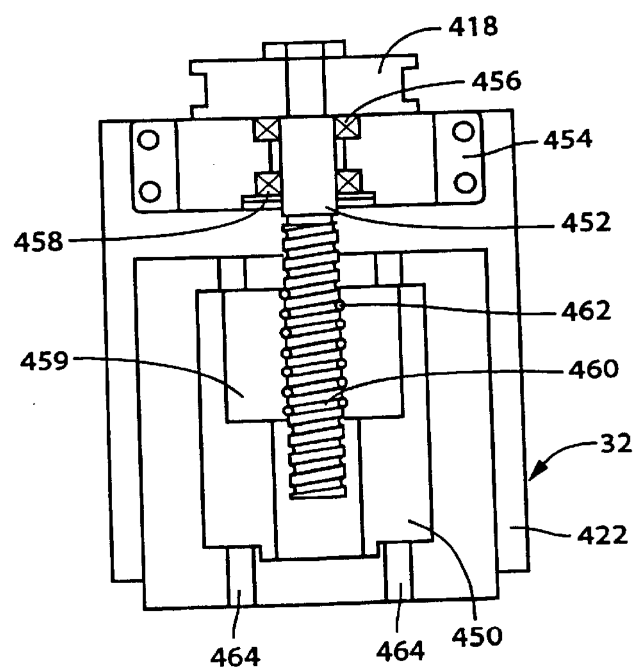
FIG. 10 is a front elevation, cross-sectioned view of a portion of another moving apparatus as a sixth embodiment of the present invention.

FIG. 10 shows a third movable member 450 which may be employed in place of the rotatable member 402 in the displacing apparatus 400 shown in FIGS. 7 to 9. The third movable member 450 is provided on the second movable member 32, such that the third member 450 is movable relative to the second member 32 in the Z-axis direction.

A support member 454 is fixed to the vertical side surface 422 of the second movable member 32, and supports a rotary axis member 452 extending downward from the flat pulley 418, via a pair of bearings 456, 458, such that the axis member 452 is rotatable about a vertical axis line, and is not axially movable, relative to the second member 32. The third movable member 450 is provided below the support member 454 fixed to the side surface 422 of the second movable member 32, such that the third member 450 is movable, and is not rotatable, relative to the second member 32. A nut 459 is fixed to the third movable member 450, and a ball screw 460 extending downward from the rotary axis member 452 is screwed in the nut 459 via a plurality of balls 462. The third movable member 450 fits on a pair of guide rails 464 which are formed on the side surface 422 of the second movable member 32 to extend vertically, and the guide rails 464 cooperate with each other to guide the movement of the third member 450 in the Z-axis direction.

In the thus modified displacing apparatus 400 shown in FIG. 10, too, the flat belt 416 allows the second movable member 32 to be moved in the Y-axis and X-axis directions, and the movement of the second member 32 causes the flat pulley 418 to be rotated. Therefore, the movement of the third movable member 450 in the Z-axis direction is controlled by the control device 70 while the movement of the second member 32 on the X-Y coordinate plane is taken into account.

Figure 11:
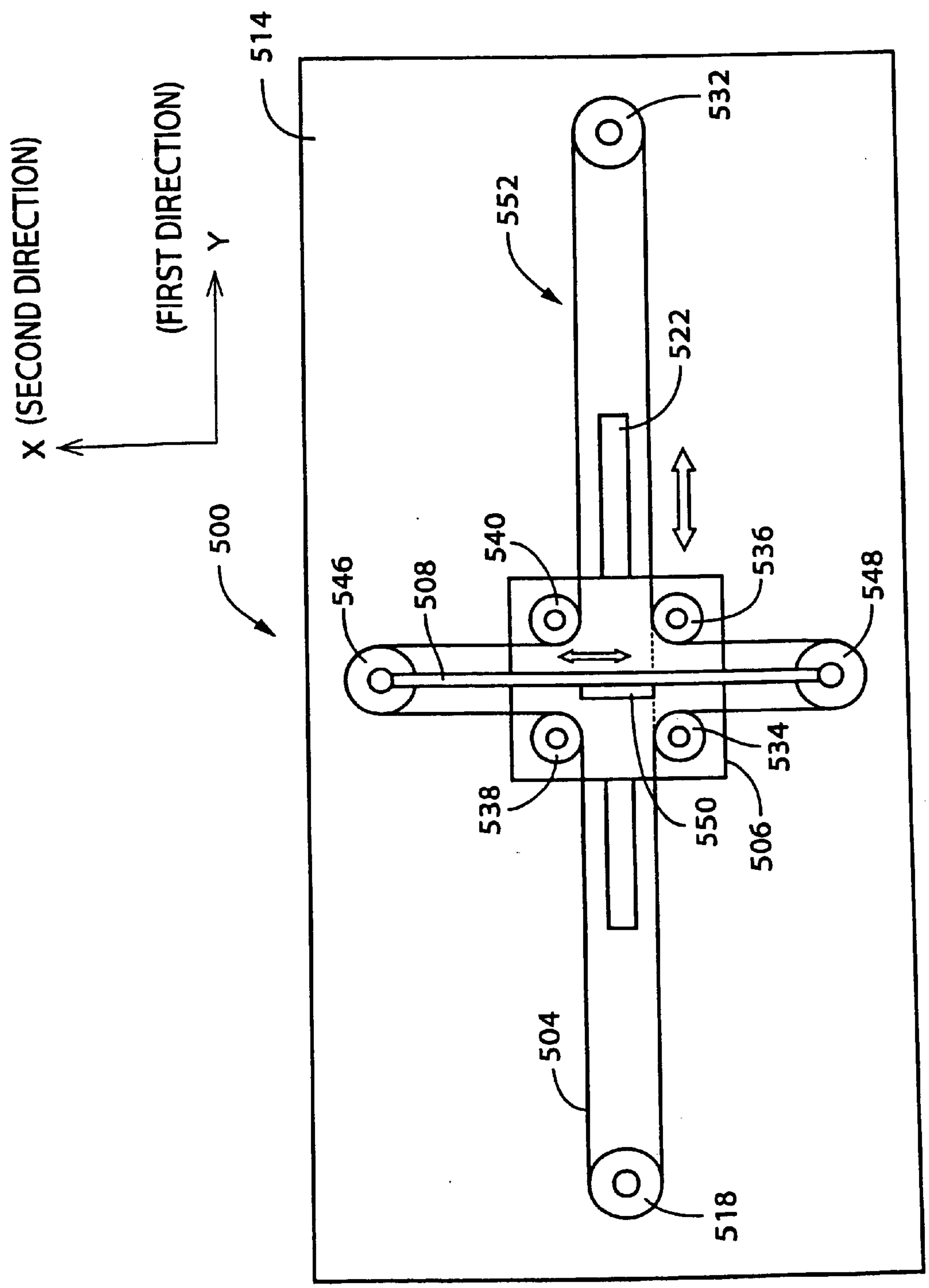
FIG. 11 is a schematic plan view of another moving apparatus as a seventh embodiment of the present invention.
Figure 12:
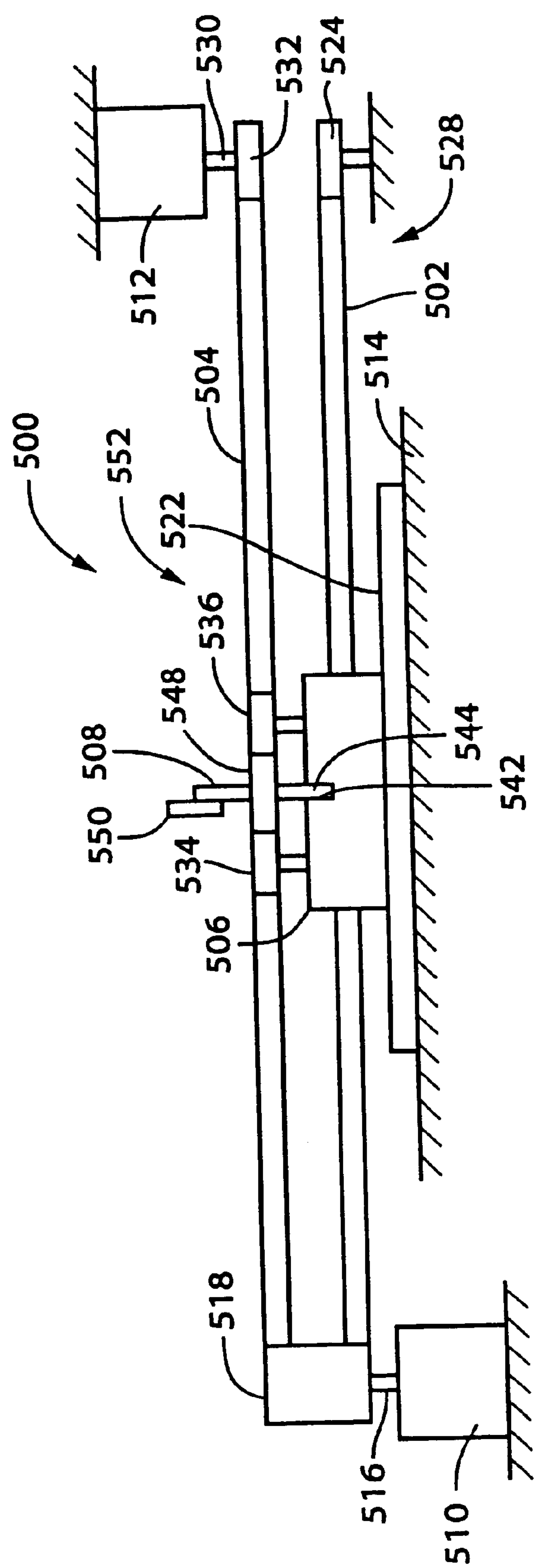
FIG. 12 is a schematic front elevating view of the apparatus of FIG. 11.
Figure 13:
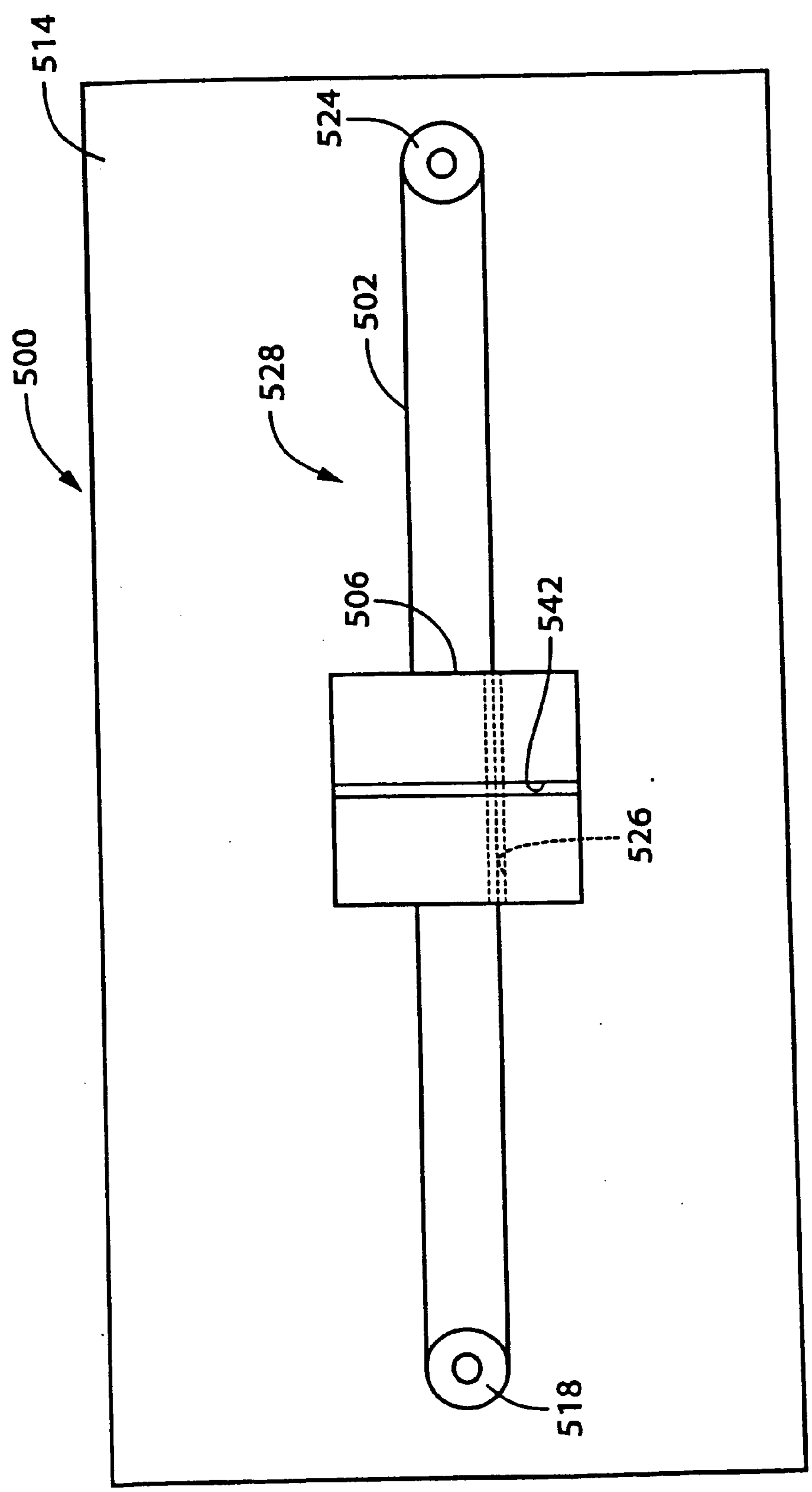
FIG. 13 is a schematic plan view of a portion of the apparatus of FIG. 11.

FIGS. 11, 12, and 13 show another moving or displacing apparatus 500 as a seventh embodiment of the present invention.

The moving apparatus 500 includes two flat belts 502, 504 as two wound-on members that are spaced apart from each other in a Z-axis direction (i.e., a third direction) perpendicular to a Y-axis direction (a first direction) and an X-axis direction (a second direction). One 502 of the two flat belts 502, 504 is associated with a first movable member 506 to move the first member 506 in the Y-axis direction, and the other flat belt 504 is associated with a second movable member 508 to move the second member 508 in the X-axis direction. Hereinafter, the moving apparatus 500 will be described in detail.

An X-Y coordinate plane which is defined by an X axis and a Y axis extends parallel to an upper surface of a base member 514 of the moving apparatus 500. Two drive motors 510, 512 as two drive sources are supported by, the base member 514, at respective positions distant from each other in the Y-axis direction. The first drive motor 510 as one of the two drive motors 510, 512 has an output shaft 516 to which a first drive wheel 518 is connected such that the first drive wheel 518 is not rotatable relative to the output shaft 516. The first drive wheel 518 extends in the Z-axis direction, and the two flat belts 502, 504 are wound on respective portions of the first drive wheel 518 that are distant from each other in the Z-axis direction. When the first drive wheel 518 is rotated by the first drive motor 510, the two flat belts 502, 504 are moved in a same direction at a same circumferential velocity. The first and second drive motors 510, 512 are connected to the control device 70 via the two drive circuits 72, 74, respectively.

The first belt 502 as one of the two flat belts 502, 504 is associated with the first movable member 506 which is movable relative to the base member 514 in the Y-axis direction. That is, opposite end portions of the first belt 502 are connected to the first movable member 506 by a well-known connecting device (not shown). A guide rail 522 is provided on the base member 514 so as to extend in the Y-axis direction, and a slide which is provided on a surface of the first member 506 that is opposed to the base member 514, fits on the guide rail 522 via balls. Thus, the guide rail 522 and the slide cooperate with each other to guide the movement of the first member 506 in the Y-axis direction. The first belt 502 is wound on a first driven wheel 524 which is provided on the base member 514 at a position distant from the first drive wheel 518 in the Y-axis direction. Thus, the first belt 502 extends in the Y-axis direction. The first movable member 506 has a belt-pass groove 526 (FIG. 13) at a portion thereof corresponding to a portion of the first belt 502 that extends in the Y-axis direction. Thus, the first belt 502 can be moved in the groove 526. The first drive wheel 518, the first driven wheel 524, and the first belt 502 cooperate with one another to provide a first drive-force transmitting device 528.

The first belt 502 may be replaced with an endless or annular belt. In the later case, a portion of the endless belt is connected to the first movable member 506 by a connecting device (not shown). The second belt 504, that is, the other one of the two flat belts 502, 504 that is remote from the base member 514 is associated with the second movable member 508.

The second belt 504, that is, the other one of the two flat belts 502, 504 that is remote from the base member 514 is associated with the second movable member 508. The second belt 504 has an endless or annular shape, and includes four portions extending in the Y-axis direction and four portions extending in the X-axis direction. The second belt 504 allows the second movable member 508 to be moved in the Y-axis direction, and transmits the respective drive forces of the first and second drive motors 510, 512 to the second member 508 to move the second member 508 in the X-axis direction.

The second belt 504 is wound on the first drive wheel 518, and a second drive wheel 532 whi.ch is connected to an output shaft 530 rotated by the second drive motor 512, such that the second wheel 532 is not rotatable relative to the output shaft 530. The first drive wheel 518 and the second drive wheel 532 are distant from each other in the Y-axis direction, so that the second belt 504 extends parallel to the Y-axis direction. The second belt 504 is additionally wound on four driven wheels 531, 536, 538, 540 which are provided on the first movable member 506 at respective height positions corresponding to the two drive wheels 518, 532, such that each of the driven wheels 534–540 is rotatable about a vertical axis line. The four driven wheels 534–540 are provided at respective positions where the four wheels 534–540 contact respective outer surfaces of the four portions of the second belt 504 that extend in the Y-axis direction, and respective outer surfaces of the four portions of the second belt 504 that extend in the X-axis direction. Between the two driven wheels 534, 538 and the other two driven wheels 536, 540, there is provided the second movable member 508 which is supported by the first movable member 506, inside the second belt 504, such that the second member 508 extends in the X-axis direction and is movable relative to the first member 506 in the X-axis direction. As shown in FIG. 12 , the first member 506 has a guide groove 542 which extends in the X-axis direction and which guides a slide portion 544 integrally formed with the second member 508. However, alternatively, two guide rails fixed to the second member 508 may be engaged via balls with a slide fixed to the first member 506. As shown in FIG. 11, two second driven wheels 546, 548 are respectively supported by opposite end portions of the second member 508 as seen in the X-axis direction, such that each of the two wheels 546, 548 is rotatable about a vertical axis line. The second belt 504 is wound on the second driven wheels 546, 548 as well. A support member 550 which supports an electric-component holder is fixed to a middle portion of the second member 508 as seen in the X-axis direction.

In the present embodiment, the second belt 504, the second driven wheels 546, 548, the four driven wheels 534–540, and the two drive wheels 518, 532 cooperate with one another to provide a second drive-force transmitting device 552.

Next, there will be described the operation of the moving apparatus 500 constructed as described above. In the seventh embodiment shown in FIGS. 11 to 13, the movement of the first movable member 506 in the Y-axis direction and the movement of the second movable member 508 in the X-axis direction are respectively caused by the two flat belts, 504 which are independent of each other, and accordingly those two movements are not interfered with by each other.

The first movable member 506 is moved in the Y-axis direction as the first belt 502 is moved by the rotation of the first drive wheel 518. In contrast, the second movable member 508 which is associated with the second belt 504 wound on the two drive wheels 518, 532, is moved based on the respective rotations of the two drive wheels 518, 532. That is, the two drive motors 510, 512 cooperate with each other to move the second member 508. Hereinafter, the manner of movement of the second movable member 508 will be described in detail by describing each of different combinations of the respective driving states of the first and second drive motors 510, 512.

First, there will be described the case where the first drive wheel 518 is not driven or rotated and Accordingly the first movable member 506 is not moved. In this case, if the second drive wheel 532 is driven or rotated by the second drive motor 512, the first length of the two X-axis-direction extending portions of the second belt 504 on one side of the second drive wheel 532 is shortened, and the second length of the other, two X-axis-direction extending portions of the second belt 504 on the other side of the second drive wheel 532 is lengthened by the same amount or length as that by which the first length is shortened. Since the second length is lengthened by the same amount as that by which the first length is shortened, the second belt 504 is not slacked or loosened. Therefore, one of the two second driven wheels 546 or 548 that corresponds to the first length is moved toward the corresponding first driven wheels 538 and 541, or 534 and 536, and the other second driven wheel 548 or 546 is moved away from the corresponding first driven wheels 534 and 536 ,or 538 and 540, by the same amount or distance by which the one second driven wheel is moved toward the corresponding first driven wheels. For example, in the case where the second drive wheel 532 is rotated clockwise in FIG. 11, the second driven wheel 546 is moved toward the first driven wheels 538, 540 by a distance corresponding to the amount of rotation of the first drive wheel 532, and the second driven wheel 548 is moved away from the first driven wheels 534, 536 by the same distance as that by which the wheel 546 is moved toward the wheels 538, 540.

Next, in the case where the first drive wheel 518 is rotated and the second drive wheel 532 is not rotated, the first movable member 506 is moved in the Y-axis direction and accordingly the second movable member 508 is moved in the same direction. Even in the case where only the first drive wheel 518 is rotated, the first length of the two X-axis-direction extending portions of the second belt 504 on one side of the first drive wheel 518 is shortened and the second length of the other, two X-axis-direction extending portions of the second belt 504 on the other side of the first drive wheel 518 is lengthened, for the same reason as explained above, so that the second movable member 508 is moved in the X-axis direction by an amount or distance corresponding to the amount or length by which the first length is shortened, i.e., the second length is lengthened.

In the case where both the first and second drive wheels 518, 532 are rotated, the two drive wheels 518, 532 are rotated, in a first case, in a same direction at a same amount or angle, and rotated, in a second case, such that at least one of the direction and amount (or angle) of rotation of the first drive wheel 518 differs from a corresponding one of the direction and amount of rotation of the second drive wheel 532 In the first case, the first movable member 506 is moved in the Y-axis direction by a distance corresponding to the amount of rotation of the first drive wheel 518. However, since the first and second lengths of the two pairs of X-axis-direction extending portions of the second belt 504 on both sides of the two drive wheels 518, 532 do not change, the second movable member 508 is not moved relative to the first movable member 506. Thus, the second movable member 508 is moved in the Y-axis direction only.

On the other hand, in the above-indicated second case, the first movable member 506 is moved in the Y-axis direction as the first drive wheel 518 is rotated, and the second movable member 508 is moved in the Y-axis direction together with the first movable member 506 and additionally is moved in the X-axis direction by an amount or distance corresponding to the difference of respective rotation amounts of the two drive wheels 518, 532. That is, in the case where the two drive wheels 518, 537 are rotated and at least one of the direction and amount of rotation of the first drive wheel 518 differs from a corresponding one of the direction and amount of rotation of the second drive wheel 532, the second movable member 508 is moved in both the Y-axis and X-axis directions. Therefore, the X-axis-direction movement of the second movable member 508 must be controlled by controlling the second drive motor 512 while taking into account the direction and amount of rotation of the first drive motor 510. That is, the second movable member 508 is moved in the X-axis direction by an amount or distance (that can be positive or negative) corresponding to the sum of the positive or negative rotation amount or angle of the first motor 510 and the positive or negative rotation amount or angle of the second motor 512. In the case where the two drive wheels 518, 532 are rotated in a same direction, the respective rotation amounts thereof take different signs, respectively.

In the seventh embodiment shown in FIGS. 11 to 13, the second movable member 508 is supported on the first movable member 506, and the support member 550 is supported by the upper portion of the second member 508. Therefore, the support member 550 is prevented from being interfered with by the first member 506.

The support member 550 is supported by the middle portion of the second movable member 508 as seen in the X-axis direction. However, the support member 550 may be supported by a portion of the second member 508 that is near one end of the same 508. For example, the support member 550 may be supported by one end portion of the second member 508, and a portion of the second member 508 that is near the other end portion of the same 508 may be supported on the first movable member 506. In the latter case, the support member 550 may be always moved within a range offset from the first member 506 in the X-axis direction, and a space below the support member 550 may be utilized for some purpose. Alternatively, the support member 550 may be supported by the lower portion of the second member 508, and an electric-component holder or the like may be attached to the support member 550 such that the holder is oriented downward.

The first movable member 506 and the second movable member 508 may be replaced with each other with respect to the Z-axis direction. In this case, too, the electric-component holder may be attached to the second member 508 such that the holder is oriented downward.

In the seventh embodiment, the single support member 550 is supported by the second movable member 508. However, a plurality of support members may be supported by the second member 508. In this case, a plurality of electric-component holders may be attached to the plurality of support members, respectively. In the case where the single support member 550 is employed, it is possible that the support member 550 be positioned at an arbitrarily selected one of a plurality of selectable positions.

In the present moving apparatus 500, the first movable member 506 is just required to include a support portion for supporting the second movable member 508, and respective support portions for supporting the four first-movable-member-side driven wheels 534, 536, 538, 540. Accordingly, the first movable member 506 enjoys a smaller size than each of the first movable members 30, 230, 330 shown in FIGS. 1 to 10.

Like the fifth and sixth embodiments shown in FIGS. 7 to 10, the moving or displacing apparatus 500 may additionally employ a third displaceable member 402, 450 which is displaceable relative to the second movable member 508; another or third drive source which is independent of the first and second drive motors 510, 520; and a third transmitting device which transmits a drive force of the third drive source to the third displaceable member 402, 450. In the latter case, the moving apparatus 500 can control the displacement of the third displaceable member 402, 450, while allowing the respective movements of the third displaceable member 402, 450 in the X-axis and Y-axis directions. For example, in the case where the third transmitting device includes a third wound-on member and a third drive wheel, the third displaceable member may be one 450 which is movable in the Z-axis direction, or one 402 which is rotatable about a θ axis line. In the last case, the third wound-on member is wound on drive and driven wheels such that the third wound-on member has substantially the same shape as that of the second flat belt 504.

In addition, the support member 550 may support any object other than the electric-component holder. That is, the moving or displacing apparatus 500 may be used for various purposes.

Figure 14:
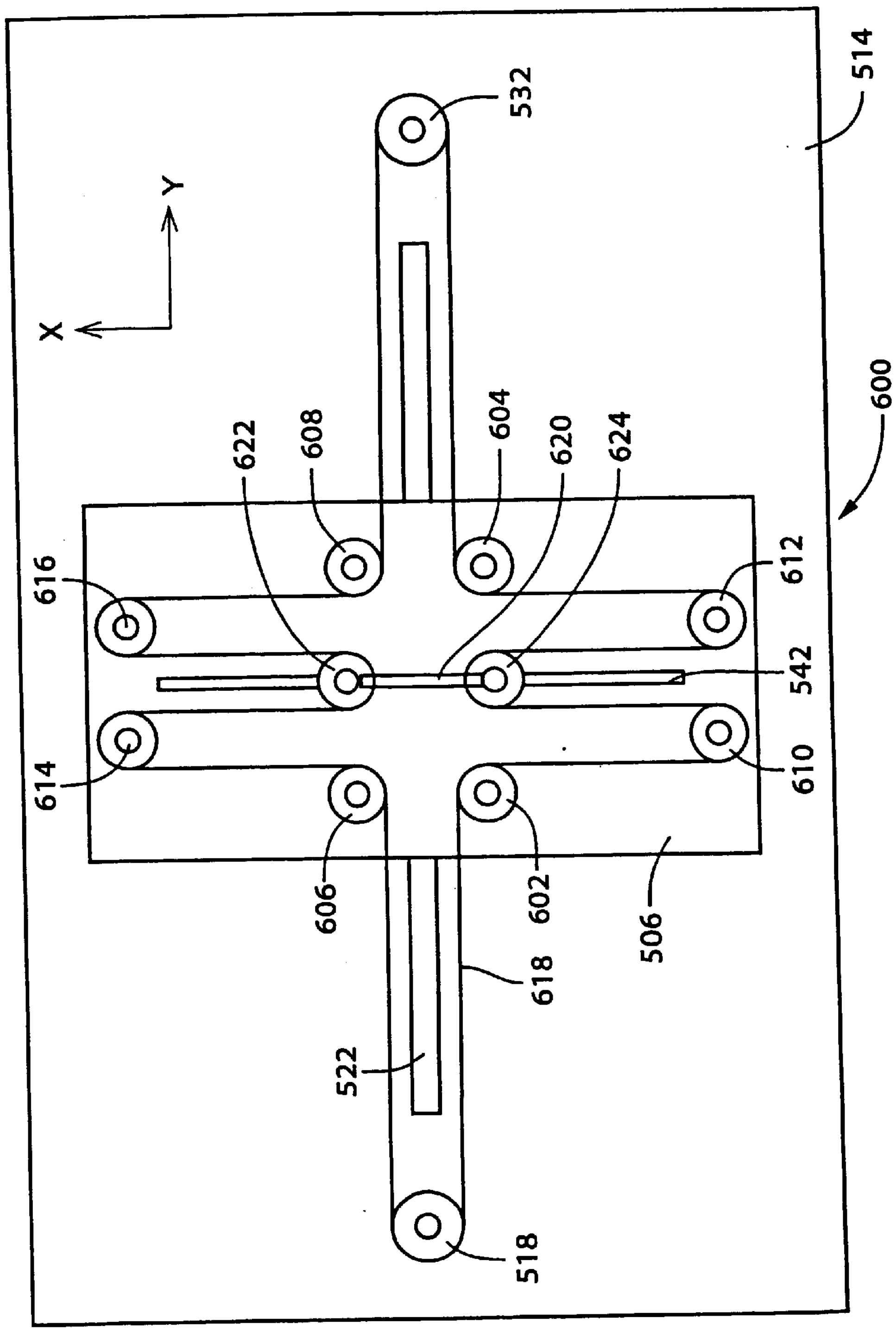
FIG. 14 is a schematic plan view of another moving apparatus as an eighth embodiment of the present invention.

FIG. 14 shows a moving or displacing apparatus 600 as an eighth embodiment of the present invention. In the moving apparatus 500 as the seventh embodiment, the second movable member 508 is elongate in the X-axis direction, and accordingly a considerably wide space is needed to assure that the second movable member 508 is moved in the X-axis direction, in view of a considerably narrow range in which the electric-component holder attached to the second member 508 is movable. More specifically described, the range in which the holder is movable is substantially equal to the length of the second member 508 in the X-axis direction, whereas a space corresponding to twice that length is needed to assure that the second member 508 is moved in the X-axis direction. Based on this finding, the moving apparatus 600 shown in FIG. 14 has been developed.

The moving apparatus 600 includes the same base member 514, first movable member 506, anti first drive-force transmitting device 528 as those of the moving apparatus 500 shown in FIGS. 11 to 13. Accordingly, the same reference numerals as used in FIGS. 11 to 13 are used to designate the corresponding elements and parts of the moving apparatus 600, and the description thereof is omitted. Different elements and parts of the moving apparatus 600 than the moving apparatus 500 will be described in detail.

In the eight embodiment, eight first driven wheels 602, 604, 606, 608, 610, 612, 614, 616 are provided on the first movable member 506, such that each of the driven wheels 602 to 616 is not movable, and is rotatable about a vertical axis line, relative to the first member 506. Four driven wheels 602, 604, 606, 608 of the eight driven wheels 602 to 616 are provided, like the first driven wheels 534 to 540 of the moving apparatus 500, at respective positions where the two wheels 602, 606 are opposed to the first drive wheel 518 and the two wheels 604, 608 are opposed to the second drive wheel 532. Hereinafter, those four first driven wheels 602 to 608 will be referred to as the "central first driven wheels". The two central first driven wheels 602, 606 are spaced apart from the two central first driven wheels 604, 608 in the Y-axis direction, by a distance equal to three times the same diameter of the eight wheels 602 to 616. An annular second belt 618 is wound on the first and second drive wheels 518, 532. The four central first driven wheels 602 to 608 contact an outer surface of the second belt 618, and thereby define four portions of the second belt 618 that extend in the Y-axis direction, and eight portions of the same 618 that extend in the X-axis directions.

The other four first driven wheels 610 to 616 of the eight first driven wheels 602 to 616 are provided on the first movable member 506 such that the four driven wheels 610 to 616 contact an inner surface of the second belt 618 and the two driven wheels 610, 612 are distant from the other two driven wheels 614, 616 in the X-axis direction. The other four first driven wheels 610 to 616 cooperate with the four central first driven wheels 602 to 608 to define the four portions of the second belt 618 that extend in the X-axis direction. Hereinafter, the other four first driven wheels 610 to 616 will be referred to as the "end first driven wheels". The two end first driven wheels 610, 614 are spaced apart from the two end first driven wheels 612, 616 in the Y-axis direction, by a distance equal to the diameter of the eight wheels 602 to 616. Four portions of the second belt 618 that extend in the X-axis direction are defined by the first adjacent two wheels 602, 610, the second adjacent two wheels 612, 604, the third adjacent two wheels 608, 616, and the fourth adjacent two wheels 614, 606, respectively.

The first movable member 506 has the guide groove 542 as the guide, and supports a second movable member 620 such that the second member 620 is movable relative to the first member 506 in the X-axis direction. Two second driven wheels 622, 624 are supported by opposite end portions of the second member 620 in the X-axis direction, respectively, such that each of the second driven wheels 622, 624 is rotatable about a vertical axis line. The second belt 618 is wound on the two second driven wheels 622, 624 as well. More specifically described, each of the opposite end portions of the second member 620 has a pair of support arms (not shown) each of which extends in a horizontal direction and which are spaced apart from each other in a vertical direction and cooperate with each other to support, via respective bearings, a rotatable axis member of a corresponding one of the driven wheels 622, 624, such that the one driven wheel 622, 624 is rotatable about its vertical axis. Between the two support arms, the one second driven wheel 622, 624 is provided such that the one wheel 622, 624 is not interfered with by the second member 620. The second belt 618 is wound on the second driven wheels 622, 624 such that each of the wheels 622, 624 contacts the outer surface of the second belt 618.

The second driven wheels 622, 624 have the same diameter as that of the first driven wheels 602 to 616, and the other four portions of the second belt 618 that extend in the X-axis direction are defined by the fifth adjacent two wheels 610, 624, the sixth adjacent two wheels 624, 612, the seventh adjacent two wheels 616, 622, and the eighth adjacent two wheels 622, 614, respectively. The second movable member 620 has a length in the X-axis direction that is shorter than that of the second movable member 508 of the moving apparatus 500. In the present embodiment, the range in which the second member 620 is movable in the X-axis direction can be increased irrespective of the length of the second member 620 in the X-axis direction, and accordingly the size of the second member 620 can be decreased.

The moving apparatus 600 constructed as described above is operated in substantially the same manner as that in which the moving apparatus 500 is operated. In particular, the first movable member 506 of the moving apparatus 600 is moved in the same manner as that in which the first movable member 506 of the moving apparatus 500 is moved, and accordingly the description thereof is omitted.

When the first and second drive motors 510, 512 are driven or rotated, the length of two X-axis-direction extending portions of the second belt 618 on one side of the first and second drive wheels 518, 532 is shortened or lengthened, the second length of two X-axis-direction extending portions of the second belt 618 on the other side of the two drive wheels 518, 532 is lengthened or shortened, so that the second movable member 620 is moved in the X-axis direction. For example, if the two X-axis-direction extending portions of the second belt 618 that are defined by the first driven wheels 614, 616 and the second driven wheel 622, are shortened, then the second driven wheel 622 is moved toward the driven wheels 614, 616, and the second driven wheel 624 is moved away from the driven wheels 610, 612. In the present embodiment, the movement of the second movable member 620 is limited by the distance between the two end first driven wheels 610, 612 and the two end first driven wheels 614, 616.

It emerge from the foregoing description that the moving apparatus 600 can be provided in a considerably small space, in view of a considerably large range in which the second movable member 620 is movable.

Like the moving apparatus 500, the moving apparatus 600 can additionally employ a third displaceable member 402, 450 which is displaceable relative to the second movable member 620.

Figure 15:
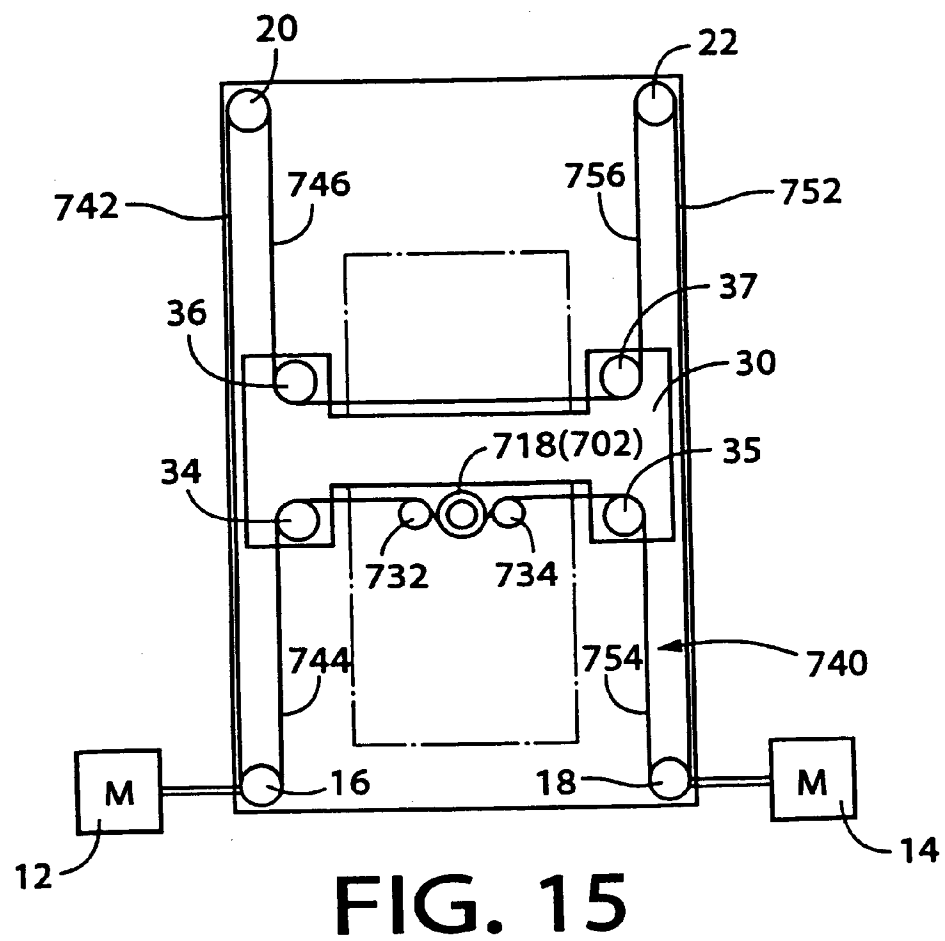
FIG. 15 is a schematic plan view of another displacing apparatus as a ninth embodiment of the present invention.

FIG. 15 shows a displacing apparatus as a ninth embodiment of the present invention. The present displacing apparatus is basically similar to the moving apparatus shown in FIG. 1, but employs, in place of the second movable member 32, a rotatable member 702 which is identical with the rotatable member 402 shown in FIG. 7 and is connected to a flat pulley 718 identical with the flat pulley 418 shown in FIG. 7. In addition, in place of the flat belt 40, the present displacing apparatus employs a flat belt 740 including six portions 742, 744, 746, 752, 754, 756 which extend in the Y-axis direction. Two guide rollers 732, 734 are supported by the first movable member 30 such that each of the two guide rollers 732, 734 is not movable relative to the first member 30 and is rotatable about a Z axis. The rotatable member 702 is connected to the flat pulley 718 by an associating device similar to that shown in FIG. 7. The control device 70 can control the two electric motors 12, 14 such that the rotatable member 702 is moved in the Y-axis direction only, is rotated only, and is moved in the Y-axis direction while simultaneously being rotated.

Figure 16:
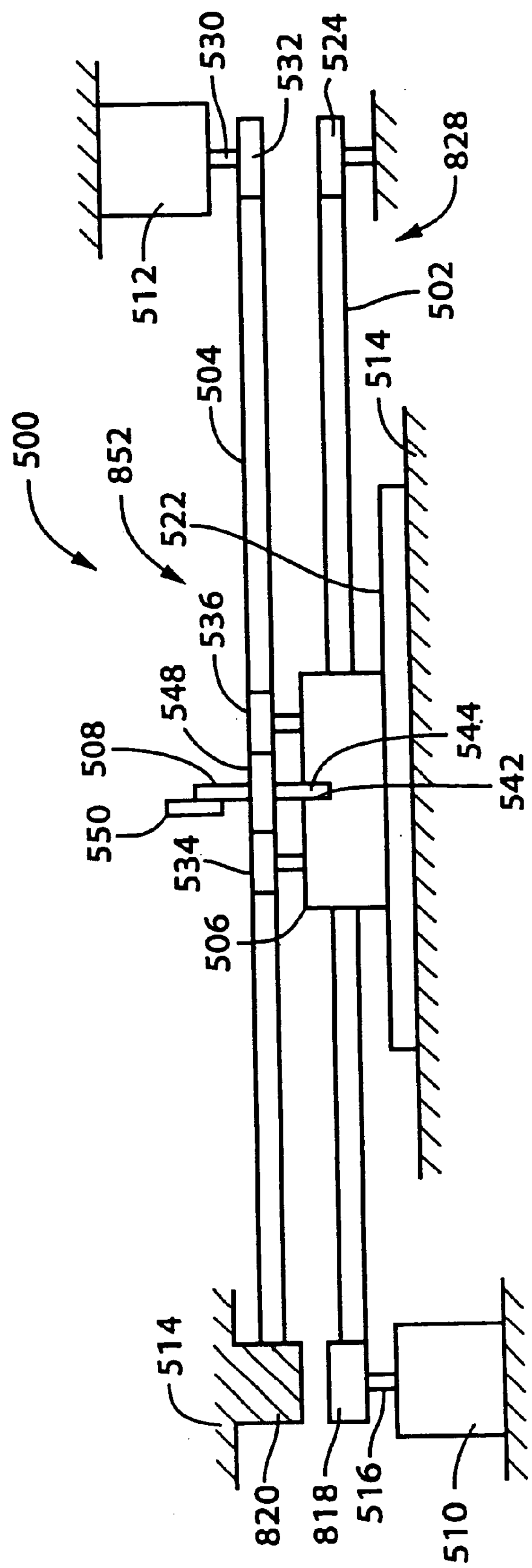
FIG. 16 is a schematic front elevation view of another moving apparatus as a tenth embodiment of the present invention.

FIG. 16 shows a moving or displacing apparatus as a tenth embodiment of the present invention. The present moving apparatus is basically similar to the moving apparatus shown in FIG. 12, but employs, in place of the first drive wheel 518, a first drive wheel 818, and an inhibiting member 820 in the form of a cylindrical projecting portion of the base member 514. The inhibiting member 820 inhibits, because of frictional resistance, the second flat belt 504 from being moved relative thereto when the second electric motor 512 is rotated. In the present moving apparatus, the first movable member 506 is moved relative to the base member 514 in the Y-axis direction by a first motion-transmitting device 828 including the first electric motor 510, the first drive wheel 818, the driven wheel 524, and the first flat belt 502, and the second movable member 508 is moved relative to the first movable member 506 in the X-axis direction by a second motion-transmitting device 852 including the second electric motor 512, the second drive wheel 532, and the second flat belt 504. Thus, the second movable member 508 is moved relative to the base member 514 in the Y-axis direction while simultaneously being moved in the X-axis direction.

The moving or displacing apparatus as each of the first to tenth embodiments of the present invention may be used in an inverted posture, or in an upright posture.

It is to be understood that the present invention is not limited to the features recited in SUMMARY OF THE INVENTION but may be embodied with other changes, improvements, and modifications that may occur to one skilled in the art without departing from the spirit and scope of the present invention.

What is claimed is:

1. An apparatus for moving at least two movable members, comprising:

a first member;

said at least two movable members comprising a second member which is supported by the first member such that the second member is movable relative to the first member in a first direction, and a third member which is supported by the second member such that the third member is movable relative to the second member in a second direction perpendicular to the first direction;

at least two drive sources including a first drive source and a second drive source which have respective output members and each of which is not movable relative to the first member;

a mechanically motion-transmitting device which is connected to the respective output members of the first and second drive sources and to the second and third members and which mechanically transmits respective motions of said respective output members to the second and third members while allowing the second and third members to be moved relative to each other; and a displacement control device which is connected to the first and second drive sources and which controls the first and second drive sources and thereby controls the movement of each of the second and third members relative to the first member, wherein the mechanically motion-transmitting device comprises a first drive wheel which is rotated by the first drive source;

a first driven wheel which is supported by the first member such that the first driven wheel is not movable, and is rotatable, relative to the first member;

a first wound-on member which is wound on the first drive wheel and the first driven wheel and which causes, when the first drive wheel is rotated, the second member to do a first movement;

a second drive wheel which is rotated by the second drive source;

a plurality of second driven wheels which are supported by the second member such that each of the second driven wheels is not movable, and is rotatable, relative to the second member;

a plurality of third driven wheels which are supported by the third member such that each of the third driven wheels is not movable, and is rotatable, relative to the third member;

a second wound-on member which is wound on the second drive wheel and the second and third driven wheels and which causes, when the second drive wheel is rotated, the third member to do a second movement; and an inhibiting member which is supported by the first member and which inhibits, under a predetermined condition, the second wound-on member from being freely moved;

wherein the displacement control device comprises a first cooperation control device which is connected to at least the second drive source and which controls the second drive source to cooperate with the first drive source to cause the third member to do the second movement equal to a sum of the first movement of the second member and a movement different from the first movement;

wherein the first and second drive wheels are provided, on the first member, at respective positions distant from each other in the first direction;

wherein the plurality of second driven wheels comprise an even number of driven wheels including (a) at least two first pairs of driven wheels which guide the second wound-on member such that the second wound-on member has a plurality of first portions which extend in the first direction and a plurality of second portions which extend in the second direction perpendicular to the first direction, and (b) at least two second pairs of driven wheels which are provided, on the second member, at two positions different from each other in the second direction, respectively, and which define respective lengths of the second portions of the second wound-on member; and wherein the plurality of third driven wheels are provided, on the third member, at respective positions distant from each other in the second direction.

2. The apparatus according to claim 1, further comprising at least one device selected from the group consisting of an electric-component holder, an image taking device, and an adhesive dispenser, wherein said at least one device is attached to the third member.

3. The apparatus according to claim 1, wherein the mechanically motion-transmitting device comprises: a first motion-transmitting device which is connected to the output member of the first drive source and to the second member, and which mechanically transmits the motion of the output member of the first drive source to the second member so that the second member does the first movement; and a second motion-transmitting device which is connected to the respective output members of the first and second drive sources and to the third member, and which mechanically transmits the respective motions of the respective output members of the first and second drive sources to the third member so that the third member does the second movement.

4. The apparatus according to claim 1, wherein the mechanically motion-transmitting device comprises: a first motion-transmitting device which is connected to the output member of the first drive source and to the second member, and which mechanically transmits the motion of the output member of the first drive source to the second member so that the second member does the first movement; and a second motion-transmitting device which is connected to the output member of the second drive source and to the third member, and which mechanically transmits the motion of the output member of the second drive source to the third member so that the third member does the second movement.

5. The apparatus according to claim 1, wherein the first and second wound-on members are distant from each other in a third direction perpendicular to the first and second directions.

* * * * *